US008250531B2

(12) United States Patent
Bolene et al.

(10) Patent No.: US 8,250,531 B2
(45) Date of Patent: Aug. 21, 2012

(54) SERVICE ASSEMBLY ARCHITECTURE

(75) Inventors: David William Bolene, Austin, TX (US); David Elliott Parkhill, Louisvillet, CO (US); Francis Joseph Glynn, Boulder, CO (US)

(73) Assignee: British Telecommunications plc, London (GB)

( * ) Notice: Subject to any disclaimer, the term of this patent is extended or adjusted under 35 U.S.C. 154(b) by 1288 days.

(21) Appl. No.: 11/808,259

(22) Filed: Jun. 7, 2007

(65) Prior Publication Data
US 2008/0250393 A1 Oct. 9, 2008

Related U.S. Application Data

(63) Continuation-in-part of application No. 11/783,431, filed on Apr. 9, 2007.

(51) Int. Cl.
*G06F 9/44* (2006.01)
*G06F 9/45* (2006.01)
(52) U.S. Cl. .......................... 717/120; 717/156
(58) Field of Classification Search .................. 717/107, 717/120, 121, 156
See application file for complete search history.

(56) References Cited

U.S. PATENT DOCUMENTS

| 6,058,378 | A * | 5/2000 | Clark et al. .................... 705/37 |
| 6,804,199 | B1 | 10/2004 | Kelly et al. |
| 7,343,413 | B2 * | 3/2008 | Gilde et al. ................... 709/226 |
| 7,593,321 | B2 | 9/2009 | Galand et al. |
| 7,873,829 | B2 * | 1/2011 | Brabson et al. ............... 713/164 |
| 7,882,209 | B1 | 2/2011 | Eslambolchi et al. |
| 2006/0066717 | A1 | 3/2006 | Miceli |
| 2008/0307438 | A1 * | 12/2008 | Creamer et al. .............. 719/318 |
| 2009/0217299 | A1 | 8/2009 | Belluati et al. |

FOREIGN PATENT DOCUMENTS

WO 2004/027548 A 4/2004

OTHER PUBLICATIONS

Rosenberg et al., SIP:Session Initiation Protocol:, http://tools.jetf.org/html/rfc3261 Jun. 2002.
Vaha-Sipila, "URLs for Telephone Calls", RFC 2806, http://tools.ietf.org/html/rvc2806, Apr. 2000.
"Business Process Execution Language", WIKIPEDIA, pp. 1-6, http://wikipedia.org/wiki/BPEL, Sep. 2005.
BPEL Primer, Sep. 9, 2005, pp. 1-8.
"Enabling the IP Multimedia Subsystem (IMS) With Java™ Technology" The Power of Java, http://developers.sun.com/learning/java-oneoline/2006/mobility/TS-8-152.pdf, 2006.
The Java Community Process(SM) Program —JSRs: Java Specification Requests—detail J.. pp. 1-8, http://www.jcp.org/en/jsr/detail?id=289 pp. 1-8 , 2007.
O'Reilly, Design Patterns and Business Models for the Next Generation of Software, pp. 1-3, Sep. 30, 2005.

(Continued)

*Primary Examiner* — Anna Deng
(74) *Attorney, Agent, or Firm* — Nixon & Vanderhye PC

(57) ABSTRACT

A multi-user communications service is configured by: setting up a choreography linking a plurality of user process control flows and a multi-user service configuration process; receiving via the choreography at the multi-user service configuration process requests from the plurality of user process control flows for access to the multi-user communications service and granting access to the multi-user communications service to selected users; in which the choreography provides a fixed interface supporting the independent reconfiguration of the user process control flows and the multi-user service configuration process.

94 Claims, 17 Drawing Sheets

OTHER PUBLICATIONS

O'Reilly, "Virtual Lab Management", http://www.oreillynet.com/pub/a/oreilly/tim/news/2005/09/30/what-is-web-20.html?page=2.

O'Reilly, "Blogging and the Wisdom of Crowds", Sep. 30, 2005, http://www.oreillynet.com/pub/a/oreilly/tim/news/2005/09/30/what-is-web-20html?page=3 , pp. 104.

O'Reilly, "End of the Software Release Cycle", Sep. 30, 2005, pp. 1-3, http://www.oreillynet.com/pub/a/oreilly/tim/news/2005/09/30/what-is-web-20.htm?page+4.

O'Reilly, Sep. 30, 2005, F5 Protects Your Network, http://www.oreillynet.com/pub/a/oreilly/tim/news/2005/09/30/what-is-web-20.html?page=5 pp. 1-23.

Java™ 2 Platform Enterprise Edition Specification, v1.4, Nov. 24, 2003—Bill Shannon, http://java.sun.com/j2ee-1_4-fr-spec.pdf.

W3C: "Web Services Choreography Description Language Version 1.0", Dec. 7, 2007—Kavantzas et al.

Ubiquity, "Appcelerator SOOF: SOA/Web Services Platform", 2006.

Ubiquity: "SIP Application Server", pp. 1-7, 2007.

Partial European Search Report dated Feb. 7, 2008 in EP 07 25 3519.

Kavantzas N. et al., "Web Services Choreography Description Language Version 1.0," W3C Working Draft, Dec. 17, 2004, pp. 1-64, XP002468055, http://www.w3.org/TR/2004/WD-ws-cdl-10-20041217/.

Peltz C., "Web Services Orchestration and Choreography," Computer, IEEE Service Center, Los Alamitos, CA, US, vol. 36, No. 10, Oct. 2003, pp. 46-52, XP011102380, ISSN: 0018-9162.

Schulzrinne, et al., "Session Initiation Protocol," Wikipedia, pp. 1-6, http://en.wikipedia.org.wiki/Session_Initiation_Protocol, circa Mar. 2007.

"Business Process Model and Notation," Wikipedia, pp. 1-7, http://en.wikipedia.org/wiki/Business_Process_Model_and_Notation, circa Mar. 2007.

Milner, et al., "π-calculus," Wikipedia, pp. 1-11, http://en.wikipedia.orgiwiki/Pi-calculus, circa Mar. 2007.

Milner, et al., "=CE=A0-calculus," Wikipedia, pp. 1-35, http://en.wikipedia.org/w/index.ph?title=%CE%A0-calculus &oldid=119067071, circa Mar. 2007.

Written Opinion of the International Searching Authority and International Search Report re PCT/GB2008/001238 dated Jul. 17, 2008 [references cited therein previously supplied to the USPTO Examiner via an IDS].

* cited by examiner

| CxfContext Property | Definition | Established by... |
|---|---|---|
| 51 — originalRequest: RequestData | - contains all original SIP Invite data | EstablishContextSBB |
| 52 — productElementID: String | - currently executing product element identity (e.g. '2WAY_SMS_OUT') | " |
| 53 — userID: URI | - who is using the product element | " |
| 54 — targetEndpoints : LinkedHashMap | - contains endpoint URIs to connect to (send invite(s) to) (map is insertion ordered [startline URI / TO header URI] pairs) | Establish TargetEndpointsSBB |
| 55 — connectConstraints: Map | - contains fired constraints that cause bypass of connect attempt (map is [fired_constraint_id / warning message] pairs) | ConsiderConstraintsSBB |
| 56 — connectResult: enum | - indicates whether connect was (bypassed, success, fail...) | ConsiderConnectSBB |
| 57 — connectStatus: integer | - established SIP response status code | ConsiderConnectSBB (or considerConstraintsSBB) |
| 58 — connectResponse: ResponseData | - contains all data from the highest precedent invitee's SIP | ConsiderConnectSBB |
| 59 — connectDeliverable: Map | - something or reference to something that was produced at the connected resource (map is [type / value] pairs) | ??? |

Figure 6

SERVICE ASSEMBLY ARCHITECTURE

RELATED APPLICATION

This is a continuation-in-part of our copending commonly assigned application Ser. No. 11/783,431 filed Apr. 9, 2007.

The invention relates to the setting up of services in communications networks and, in particular, to a system and method for configuring a multi-user communications service.

BACKGROUND

The rapid design and creation of new services has been a goal of the telecommunications industry for some time, dating at least to the post-divestiture era in the U.S. of the late 1980's. At that time many companies invested heavily in developing "service creation platforms" using conventional switches provided with "service interfaces" that allowed a limited level of call-control to be managed by a separate computer known as an adjunct processor. These efforts were motivated by the desire of a diversity of new companies, primarily the divested Regional Bell Operating Companies (RBOCs) in the US, to differentiate themselves from their siblings and other carriers with new communication services. Up until this point, the only features available for offer were those that were embedded in the traditional telecom switches such as the 5ESS. Creation of a new feature or service required the carriers to make a request of the switch supplier (AT&T, Northern Telecom, Ericsson, et al.) for the new feature, essentially requesting a custom development effort from the switch supplier. The costs and development times associated with such customizations were often very substantial, resulting in multi-million dollar quotations. The costs of building such services were so high that very few were actually built.

During this time however, new features and functionality such as in-network voice mail and E-911 services became feasible through the above noted service platforms and adjunct processors. Though there were some successful initiatives in this era, the associated capital costs and development intervals were still prohibitive for services except those that were expected to be widely adopted. Predicting such adoption was very difficult; even some services that were built directly into the switch were not commercially successful.

Examples of multi-party services include a multi-party audio conference call, or a chat room. In such services, users can enter and leave at their discretion, as long as they are authorized to be part of the conference call or chat room. Multimedia, multiparty services can also be implemented with this invention. An example of such a service would be an audio and video conference with multiple participants. The participants in such a conference may have different levels of capability, such as the ability to see (or not see) the video feed or the ability to send video or audio (or not) to the other conference participants. Such a service would be similar to, but could have more features than the commonly used services provided by companies such as WebEx.

Multi-party services are increasing in complexity. Conventional techniques for creating multi-party services are unable to adequately mask this complexity and place an increasing burden on the service creator. There is a need for a more sophisticated method for creating multi-party services that simplifies the user interface and reduces the level of skill required by the service creator.

The inventors of the present invention have investigated the above issues and developed the Service Assembly Architecture (SAA) to address the need for a more sophisticated method for creating multi-party services that simplifies the user interface and reduces the level of skill required by the service creator. According to the invention, the SAA is based on a set of reusable, atomic, service flow management components. These are characterized by standard interfaces that allow for the components to be assembled in any order to provide a desired overall communications control function. The standard interface is complemented by a standard data structure that provides the input and output to each component. Hence, there is a high degree of standardization throughout the SAA. The provided control function is implemented in an associated communications network. The SAA allows the rapid creation of new and converged telecommunications services employing reusable service flow elements of various granularities to construct the service.

The present invention applies these novel techniques and defines new constructs that enable the rapid creation of new, converged, multi-party telecommunications services. The need for this ability in the telecoms industry is more acute than ever, with the convergence of fixed line, mobile and media services all melding into a common industry with common customers. According to various embodiments, users associated with the processes can join and leave such services at different points in time with differing levels of service or access capabilities.

The present application describes an additional capability that enables additional types of services to be constructed using the service assembly approach. The multi-party services envisioned have traditionally been implemented with expensive and isolated platforms, such as the WebEx platform from WebEx and LiveMeeting platform from Microsoft or through custom infrastructure such as that associated with the BT Conferencing services or other conferencing service provided by suppliers such as AT&T, Raindance or Gensys.

The inventors have developed choreography means for supporting a message exchange between each of a plurality of users, each represented by a process flow, requesting a multi-user communication service and configuration means for defining the multi-user communication service; in which the choreography means provides a fixed interface supporting the independent reconfiguration of the process flows and the multi-user service configuration process.

Traditional call management is built using an "event management" loop and a state machine for the main aspect of call handling. According to the traditional call management, as each new event is processed, the state of the call is assessed and progressed to the next eligible state for that call, as dictated by the event. This requires that the state for each call in progress is kept active until the call terminates. This approach can lead to very complex code in which it is very difficult to avoid errors. According to an aspect of the invention, by exploiting Business Process Management (BPM), the state transitions are defined by the interactions and interaction sequences: there is no main event loop; and no process is required to explicitly save or restore its state. The BPM language processor is able to maintain the state of several processes automatically.

The application of BPEL/BPM in consistent forms for representing different Interaction Sequences and Interactions differs from conventional application of BPEL/BPM. Conventional applications of BPEL/BPM to process modeling use BPEL/BPM as a scripting language in a crafted, unorganized fashion similar to a procedural program which leads to serious problems with maintaining the resultant code.

BRIEF DESCRIPTION OF THE DRAWINGS

Further features and advantages of the present invention will become apparent from the following detailed description of embodiments thereof, described by way of example only, with reference to the accompanying drawings, wherein:—

FIG. 6 shows a schematic for a data structure used in embodiments of the present invention;

DETAILED DESCRIPTION OF EMBODIMENTS

Figure 1:
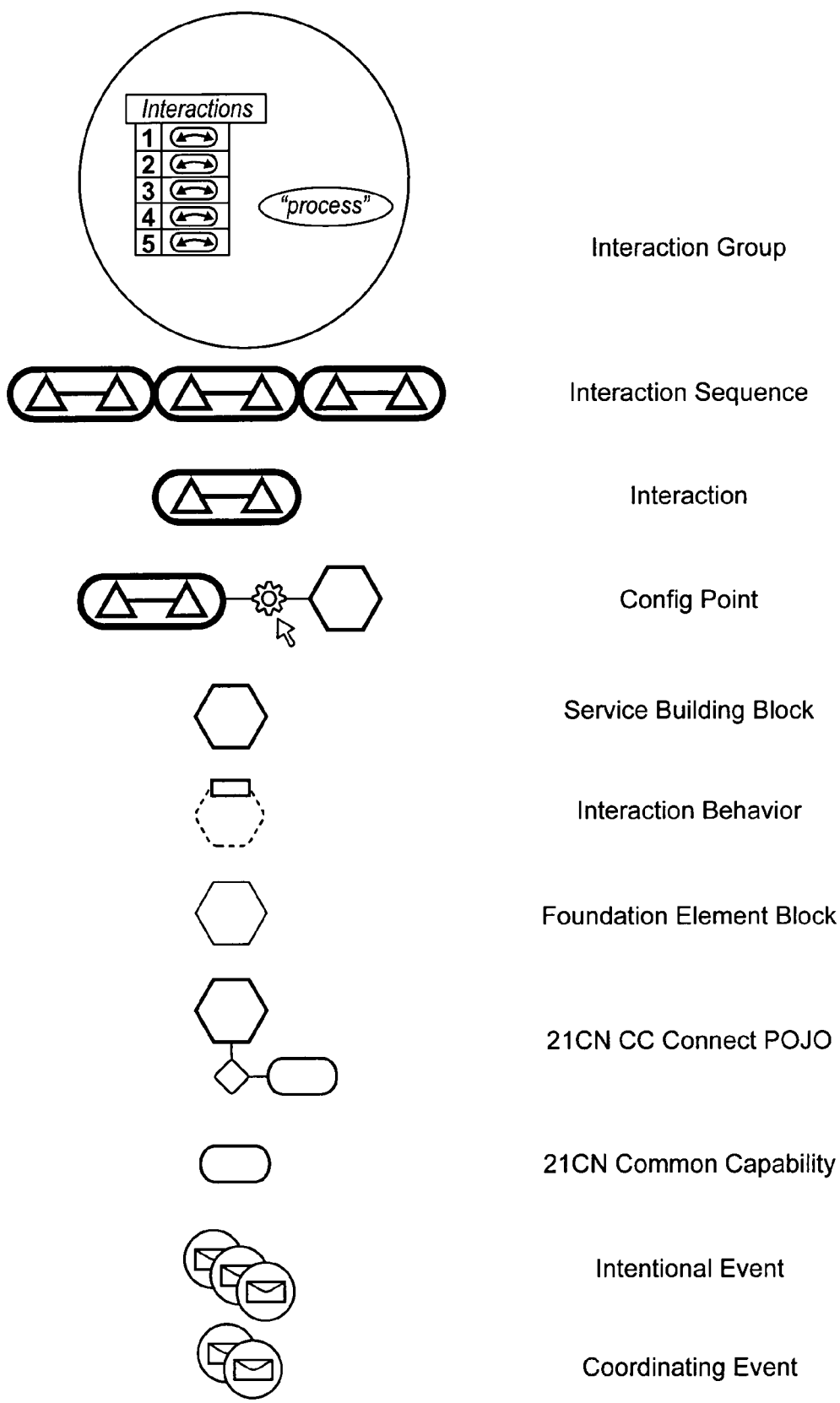
FIG. 1 presents an overview of a design notation used in this specification.

The invention is defined in the claims and will be described here with reference to preferred embodiments. We shall first describe the main building blocks of the SAA and then proceed to describe how these building blocks can be assembled to create a communication service.

Interaction

An Interaction in exemplary embodiments is a unit of connection coordination between two endpoints in a communications network. An Interaction in exemplary embodiments is a primary service control flow consisting of the exchange of control information between two given communication device endpoints. As such, it is capable of receiving from one of the endpoints an input defining a task and of responding to that input by generating appropriate outputs and, as necessary, receiving and processing further inputs from one or other endpoint. As indicated above, the inputs and outputs conform to the standard SAA data format (known as the Cxf context—where Cxf stands for "communications experience framework").

Interaction Behavior

Each interaction itself comprises a standard internal format comprising building blocks known as "Interaction Behaviors". Each Interaction is formed from a small set of all Interaction Behaviors. Each Interaction Behavior has standard interfaces with inputs and outputs conforming to the standard Cxf context data format. Hence the internal structure of each Interaction follows a uniform pattern and reflects the overall standardized nature of the SAA. Having said that, some of the Interaction Behaviors in a particular Interaction may be null or stubs with no active role to play in the operation of that Interaction.

An Interaction Behavior provides a basic step in the control flow processing of the Interaction of which it forms part.

At the level of interaction behaviors, an interaction in exemplary embodiments may take one of two types, referred to as asynchronous and synchronous. In the context of the first, asynchronous type of Interaction, the Interaction Behaviors included in exemplary embodiments and their associated functions are as follows:

1. Establish_end_point—populates targetEndpoints with the URIs to connect to Consider_constraints—examines the targetEndpoints and determines whether a connect attempt should not be made and records why in connectConstraints.
2. Consider_Constraints examines the targetEndpoints and determines whether a connect attempt should be made or not and records why in connectConstraints
3. Consider_connect—triggers a connect attempt to the URIs listed in targetEndpoint(s). This action is called but its internal implementation is bypassed if any connectConstraints are present in CxfContext. It calls back to the Interaction asynchronously waiting for the return call back (next step).
4. Wait_for_reply—not implemented with a service building block (see later), just an action in the Interaction's Business Process Execution Language (BPEL) that is asynchronously called back by the Interaction's Consider_connect building block.
5. Record_result—invokes logging and is where things like pre-pay (eWallet) clearing are initiated.
6. Return_result—calls back to the Interaction Sequence.

Figure 2A:
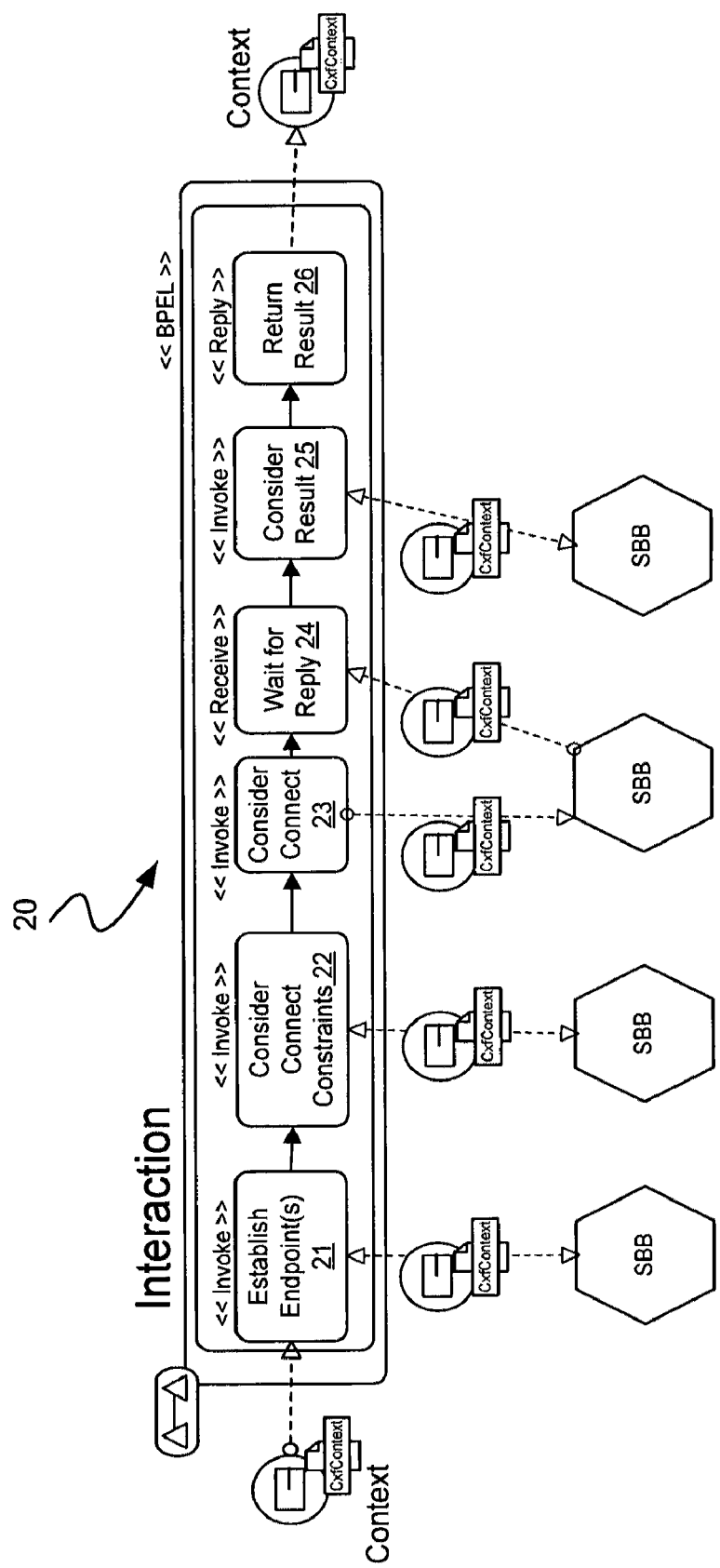
FIGS. 2a and 2b show a schematic for two reusable components according to embodiments of the present invention.

Items 1-6 are characteristic of every Interaction of the first type in exemplary embodiments, although, depending on the context, some will not result in any action being taken besides returning control, as explained in more detail, below. An example of a simple Interaction of the first type is shown in FIG. 2a.

The implementation of interactions and interaction sequences take advantage of the features of the BPM language platform. The "wait_for_reply" construct, characteristic of the asynchronous interaction, exploits such a feature of the Business Process Execution Language (BPEL). BPEL allows for the asynchronous dispatching of a request to another process, allowing the original process to continue performing other work rather than stopping and waiting for reply. In such a case, when the reply to the request arrives, the BPEL platform directs the reply to the correct agent of the process that made the request. This enables conservation of computing resources by allowing the agent that made the request to be put in a quiescent state while the request is outstanding. Hence, "wait_for_reply" differs from the other interaction behaviours in that it is not implemented as a building block, but rather as the BPEL construct described above.

In the first interaction type, we see the general case for an interaction that behaves asynchronously between the consider_connect behaviour and the wait_for_reply behaviour. However, there are cases where this is not required, such as when a message is being dispatched to an SMS target message dispatch service or a voicemail box. In these cases, the second, synchronous type of interaction is invoked. In the context of the second type of Interaction, the Interaction Behaviors included in exemplary embodiments and their associated functions are as follows:

1. Establish_end_point—populates targetEndpoints with the URIs to connect to.Consider_constraints—examines the targetEndpoints and determines whether a connect attempt should not be made and records why in connectConstraints.
2. Consider_Constraints examines the targetEndpoints and determines whether a connect attempt should be made or not and records why in connectConstraints
7. Synch_connect—synchronously triggers a connect attempt to the URIs listed in targetEndpoint(s). This action is bypassed if any connectConstraints are present in CxfContext
5. Record_result—invokes logging and is where things like pre-pay (ewallet) clearing are initiated
6. Return_result—calls back to the Interaction Sequence.

Figure 2B:
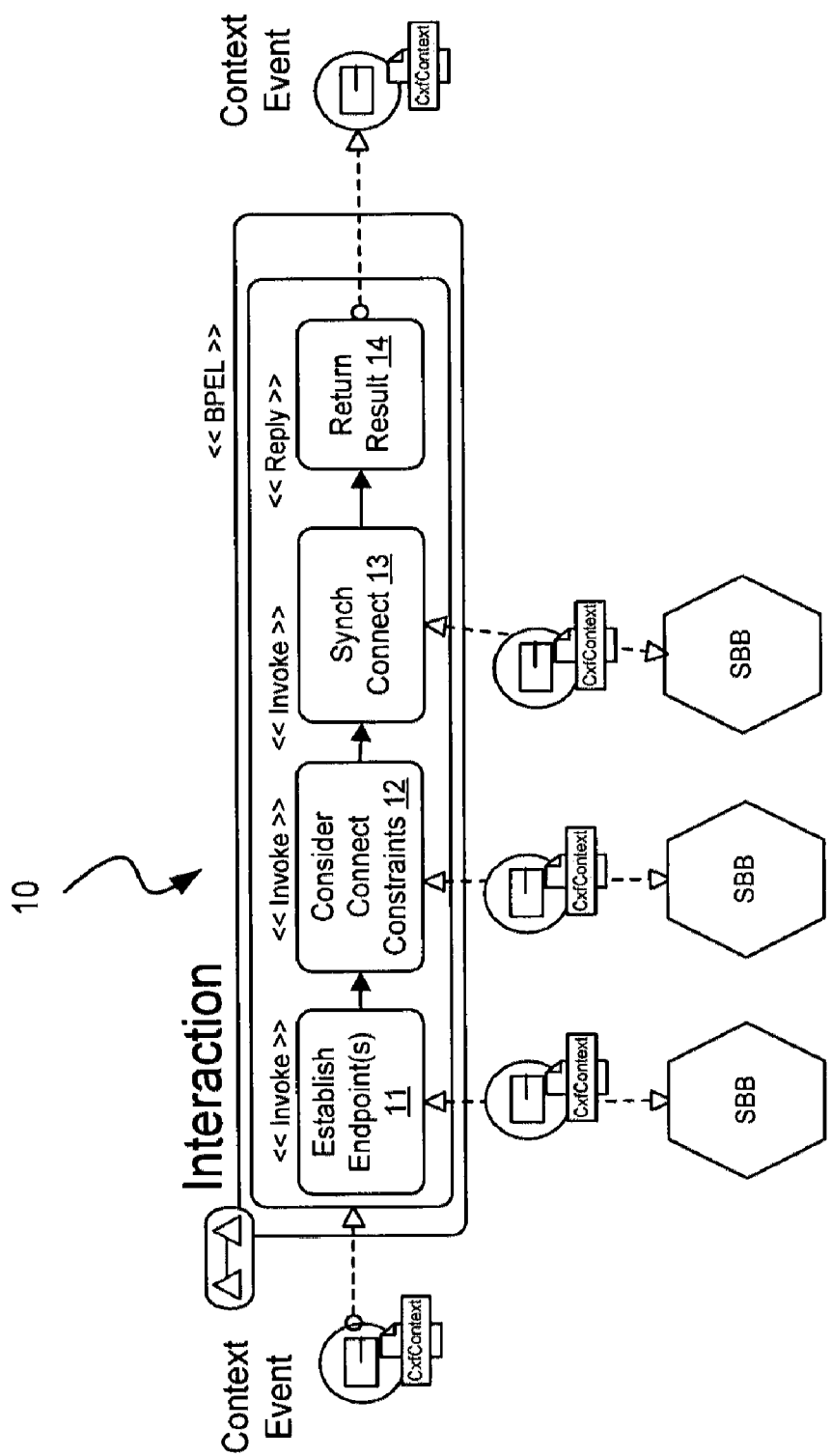

Items 1, 2, and 5 to 7 are characteristic of every Interaction of the second, synchronous type, although, as with the first type, depending on the context, some will not result in any action being taken apart from returning control, as explained in more detail, below. An example of a simple Interaction of the second type is shown in FIG. 2b.

In the second type of interaction, the synch_connect interaction behaviour replaces the consider_connect and wait_for_reply interaction behaviours present in the first interaction.

In the context of an Interaction Sequence, there is one additional interaction sequence behaviour, as follows:

8. Establish_context—initially creates and populates the CxfContext data structure.

The Establish_context interaction behaviour does not form part of an interaction but is called by the interaction sequence as part of the initial setup before the first interaction of the sequence is invoked (see Interaction Sequence section, below).

Service Building Block (SBB).

The processing step represented by each Interaction Behavior (except set out above in relation to the wait_for_reply behavior) is implemented through a corresponding building block—a Service Building Block (SBB) which implements the Interaction Behavior. E.g. a Consider_connect SBB, instructs communications network hardware (e.g. a media server) to perform the appropriate task (e.g. collect DTMF digits). There is one-to-one equivalence between each Interaction Behavior and its corresponding SBB. SBBs occupy the application layer in the service assembly architecture. A SBB can be tailored to interface to a particular network element. A number of possible SBBs are illustrated in the Interaction drawings (FIGS. 2a and 2b). For simplicity in the examples set out, later, we shall refer to the Interaction Behavior as the actor in the process flow but it will be understood that each is implemented by a corresponding SBB. A useful way of looking at this relationship is to view the Interaction Behavior as an interface to the associated SBB.

Figure 3:
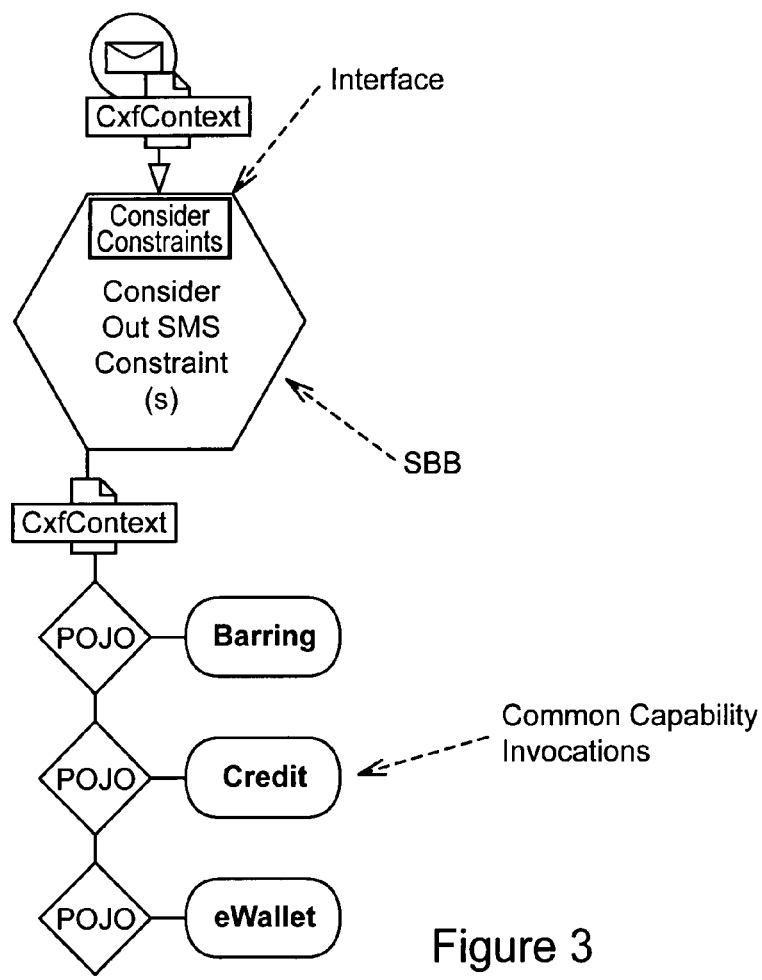
FIG. 3 shows a schematic for reusable sub-components according to embodiments of the present invention.

An example SBB in shown in more detail in FIG. 3. The first thing to notice is that network level services (Common Capabilities) are introduced into the model in a way that the Interaction Sequence, the Interactions, and other SBBs have no knowledge of. Their use is completely encapsulated by the SBB behind the SBB's generic interface. Their effect is recorded in the generic CxfContext data structure and is treated generically and appropriately by other SBBs. In the case of the Consider Constraints SBB of FIG. 3, a Common Capabilities call may result in another entry in connectConstraints Map 55 (see FIG. 6) in CxfContext, described later.

Plain old Java objects (POJOs) are used to encapsulate calls to the Common Capabilities. Advantageously, Common Capability POJOs are reusable across different SBBs, and all POJOs implement the same simple interface that simply takes the CxfContext and returns it back to the calling SBB to be passed to the next POJO. This design makes it possible to incrementally add Common Capabilities into the mix in a way that significantly reduces the risk of introducing bugs, once the Interaction flow is working, Common Capabilities can be incrementally introduced quickly as the design evolves. In addition, data configuration is introduced at the binding points from the Interaction to the SBB. This provides for the design placement and runtime passing of XML configuration data that parameterizes the behavior of the SBB at the call point. This approach enables another level of reuse of SBBs across Interactions and supports a fixed set of SBBs that are design-time configured to have the appropriate behavior implementation for the Interactions.

Interaction Sequence.

Interactions can be concatenated to form larger communication service components, known as Interaction Sequences. Interaction Sequences are capable of implementing more complex communications process flows. As each Interaction Sequence is comprised of a number of Interactions, it will be understood that each Interaction Sequence enjoys the same, standard interface as the Interactions which make it up. They also share other essential characteristics with Interactions in that all input and output and internal processing is based on the standard Cxf context.

There is a need for the interaction sequence to do some initial setup before the first included interaction is invoked. The Establish_context interaction behavior is called by the Interaction Sequence prior to the call to the first interaction of the interaction sequence. In this manner, the CxfContext data structure is populated for processing by the first interaction of an interaction sequence (See example 1, below: Processing the Cxf Context Data Structure).

Interaction Sequences and their Interaction Behaviors are server side software agents that operate on behalf of endpoints and by extension endpoint users. According to preferred embodiments, these agents are hosted in containers and their control flows are implemented according to process-based techniques underpinned by Business Process Execution Language (BPEL) or XLANG.

Figure 4:
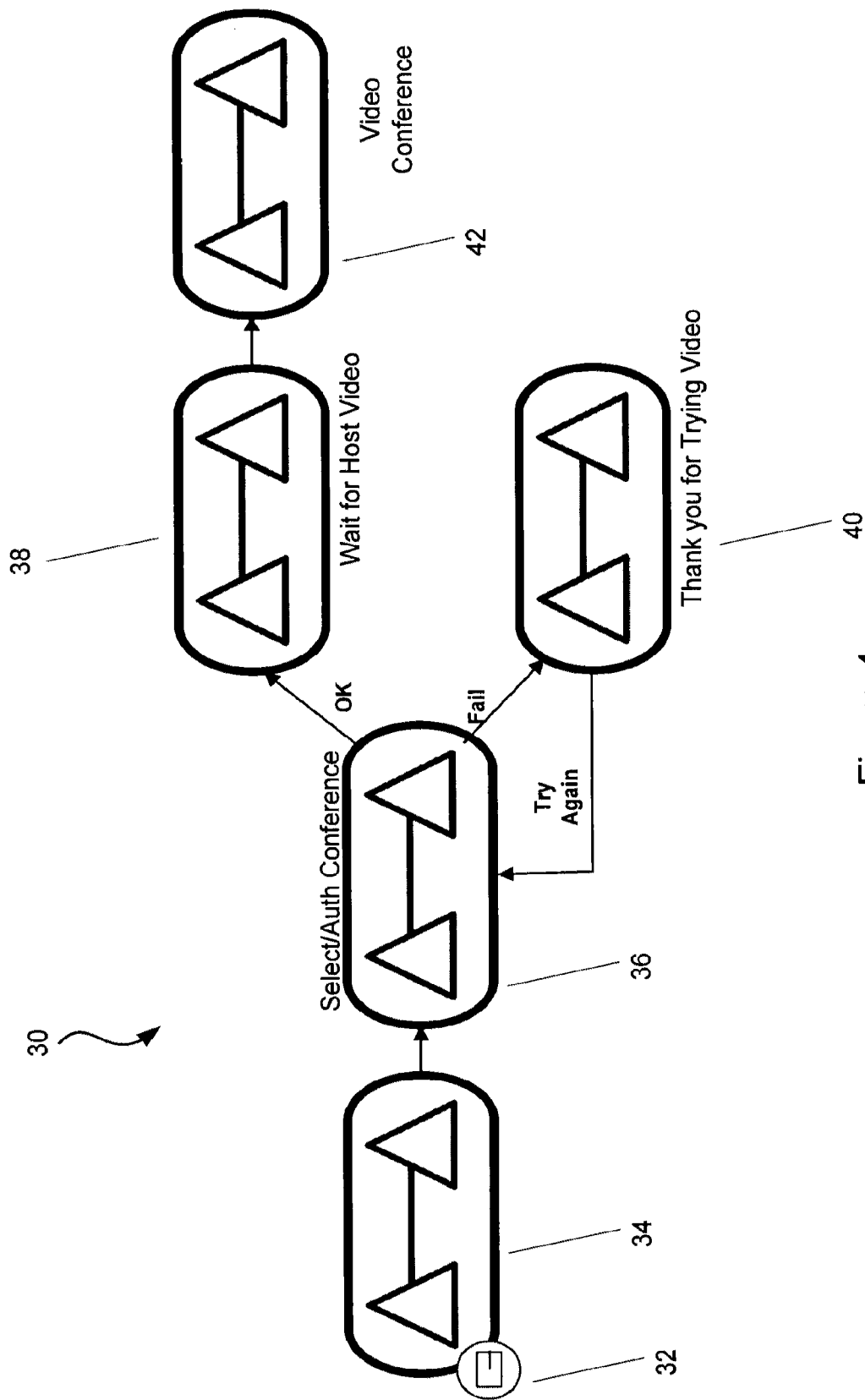
FIG. 4 shows a schematic for a sequence of reusable components according to embodiments of the present invention.

The concatenation of Interactions into Interaction Sequences mirrors the way that communication sessions between users in the communications network can be chained together in ways that create a broader experience. An example of a simple Interaction Sequence is shown in FIG. 4. FIG. 4 shows a process to invite a user to join a conference call. The conference may be between two or more users: the actual number is irrelevant to this example which just deals with the interface to a single user (not the chairperson) wishing to join.

The interactions of a sequence can be chained together in the form of directed graphs, with the Interactions as nodes of the graph, enabling branching and looping behavior to be implemented. Interactions execute in a sequential, linear manner with control paths between Interactions modified by results generated in the interaction behaviors. The flow of the interaction sequence will depend on these results and decision testing.

For example, in the "select/auth conference" Interaction of FIG. 4, the output of the "consider result" Interaction Behavior (as shown in FIG. 2a) will depend on the authorization criteria and the control flow from the "select/auth conference" Interaction, will branch to the "OK" path or the "fail" path, accordingly.

To recap, interaction components (Interactions, Interaction Behaviors, Interaction Sequences) initiate activity with network elements and other Interaction Components using Service Building Blocks.

Interaction Components are reusable, in the sense that they can be assembled together to form new services by virtue of their plug compatibility, supported by the standard interface of the Cxf Context.

According to a preferred embodiment, Interaction Component interfaces are based on industry standard Web Services Description Language (WSDL). The effect of this standardized interface is that any Interaction Component can call any other Interaction Component in a polymorphic manner. This means that Interaction Components are pluggable and reusable across different Interaction Sequences.

Figure 5A:
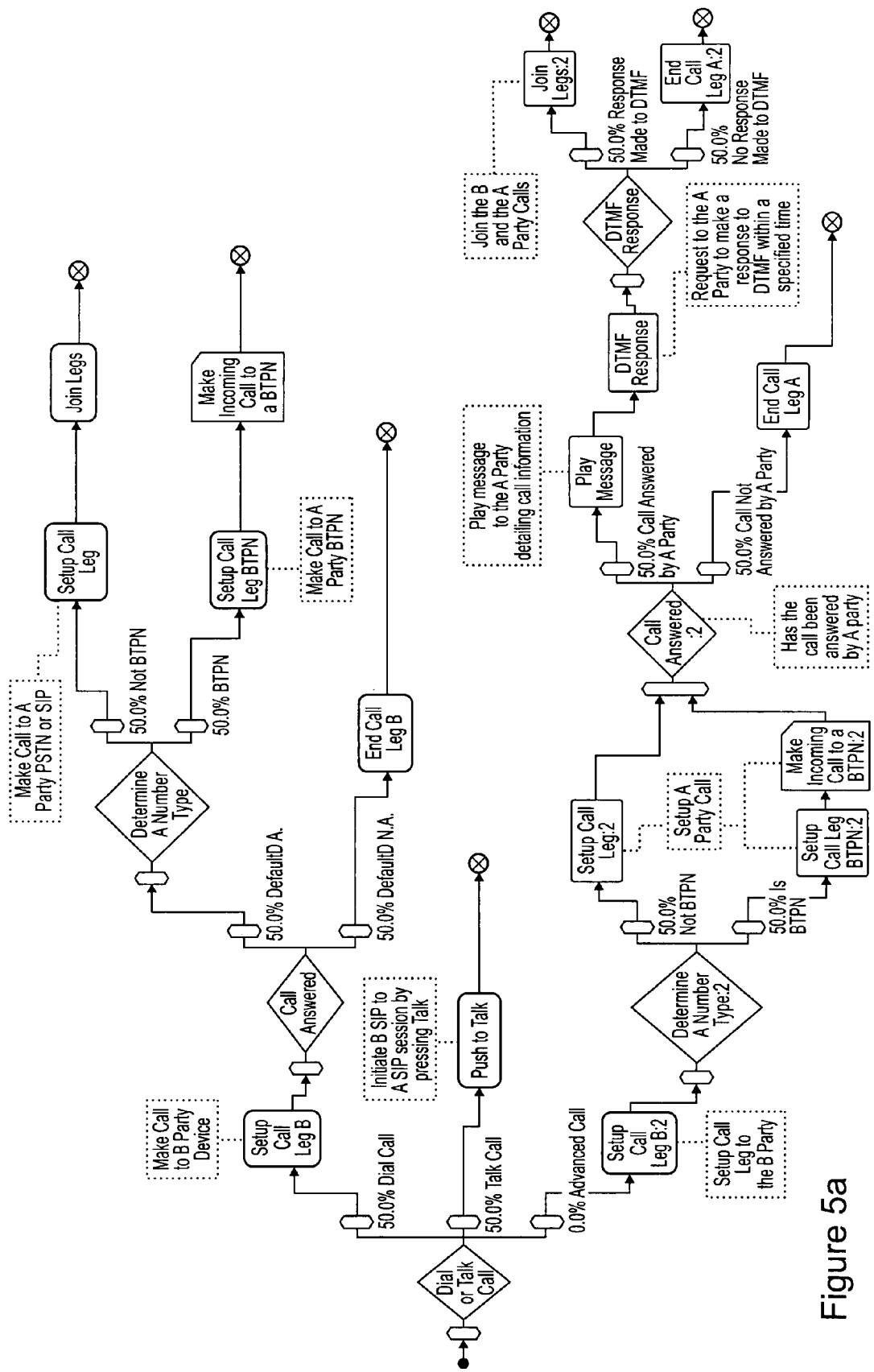
FIGS. 5a and 5b show an application of process design to communications services according to an earlier, unpublished method.

The application of BPEL/BPM in consistent forms for representing different Interaction Sequences and Interactions differs from conventional application of BPEL/BPM. Conventional applications of BPEL/BPM to process modeling use BPEL/BPM as a scripting language in a crafted, unorganized fashion similar to a procedural program which leads to serious problems with maintaining the resultant code. An example of this conventional style of BPEL/BPM applied to a communication service is shown in FIG. 5a.

Figure 5B:
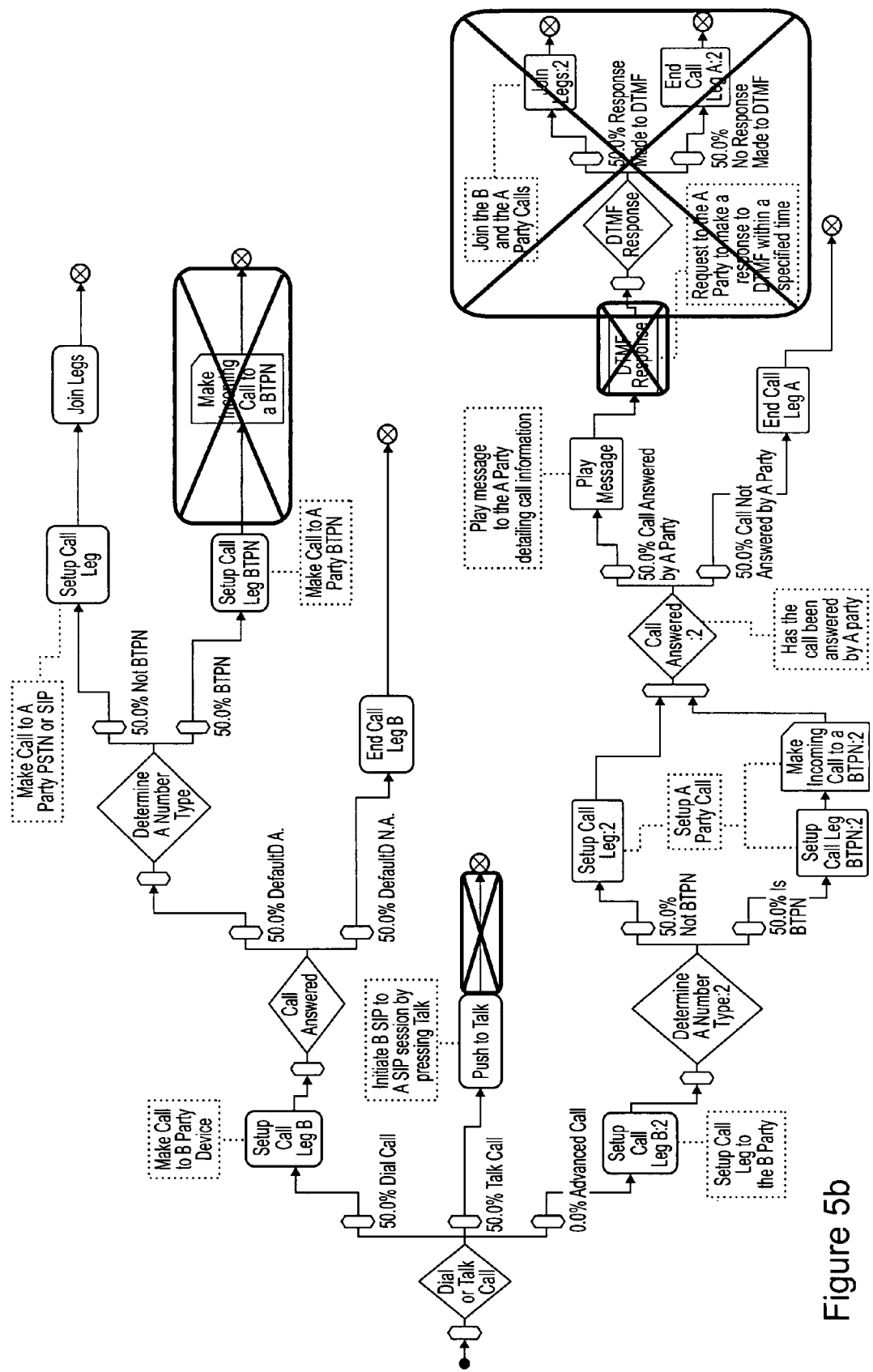

Like any procedural program that captures a pedantic, stream-of-logic control flow, this application of BPEL/BPM leads to service implementations that are difficult to evolve as requirements change or new features are added. In the software industry, "refactoring" is a method of re-organizing code to accommodate change. This conventional style of crafting, lacks rigor, and inhibits incremental evolution in a controlled, low risk and direct manner. As a way of illustration, consider FIG. 5b which shows a set of modifications to effect a change to the service created by the logic represented in FIG. 5a. In FIG. 5b, there is no one place to point to where the change affects the implementation: the effect is evident throughout the implementation, not incremental to it.

Cxf Context

The Cxf Context is as shown in FIG. 6 and comprises the following nine fields.

OriginalRequest: Contains the originating SIP Invite data, conforming to the SIP Servlet API 1.0. Specify key SIP Invite fields and their prospective values ProductElementID: the name of the service being invoked. The field consists of a character string such as ASCII or Unicode with a descriptive name of the service (as defined by the service designer).

userID: the identity of the user invoking the service in Uniform Resource Identifier (URI) (e.g. "sip:bobWilson@aDomain123.com") or a telephone number specific Uniform Resource Locator (URL) format known as TelURL, and as defined by industry standard IETF RFC 2806. URIs in this context are defined by the industry standard SIP Servlet Spec (see IETF RFC 3261). TelURLs are formally defined by IETF RFC 2806. They are essentially phone numbers that accommodate international dialing formats.

targetEndpoints: the identity of the endpoints of the requested service. In practice this could comprise a linked (ordered entry) hash map (e.g.: java.util.LinkedHashMap) identifying the endpoints to which connections are to be attempted by the Interaction in the course of the service flow. This element is a data structure of linked pairs of endpoint values of the form [startline URI/TO header URL], where the first value is a key and the second is a value. The startline URI is the next destination in the series of destinations that are involved in a request; the TO header URL is the ultimate intended destination for the invite or request.

The targetEndPoints field can hold multiple target destinations. This is due to the fact that at a SIP signalling level, it is possible to dispatch SIP INVITEs to multiple destinations as part of a single SIP transaction. SIP allows for sequential attempts to a list of destinations for scenarios like "hunt groups" or "follow-me/find-me". In this case, SIP allows for trying to connect to endpoints in a list and the first successful connect terminates the connect attempts.

Another SIP scenario allows for parallel or simultaneous connection attempts and the first successful connect causes a cancellation of the other pending connect attempts.

The scope of a set of "targetEndPoints" is a single Interaction. Each Interaction starts "anew" and establishes its set of "targetEndPoints" for the "consider_Connect"/"synchronous_connect" Interaction Behavior.

connectConstraints: a list of any constraints applied to the set of total circumstances of the attempted communication, one which may be the user. In practice this could comprise a data structure map containing those constraints which were found, after checking by the consider constraints Interaction Behavior, to apply for the context under consideration. The data type of the map entries is a pair of character strings, the first of which identifies the source network element, network level service, or capability of the constraint found, and the second of which identifies the specific constraint. Examples of such constraints include presence check, credit-worthiness check, call barring. An example of such an entry would be:

("http://com.bt.commonCapabilities.PresenceService", "Not present");

connectResult: the result of the requested service control flow, including any connection attempts carried out as part of the service flow; the status of the connection attempt. The possible values of this field and their associated semantics are:

OK—the connection attempt was successfully completed;

Error—the connection attempt was made, but not successfully completed;

No connect attempt—the connection attempt was not made due to an applicable constraint or other failure condition such as an invalid URI.

connectStatus: the response to the connect request. In practice this could comprise a SIP response status code with reference to whether the connect succeeded or failed, spanning the values of the domain specified for this parameter in the SIP Servlet spec; SIP responses have a three-digit status code that indicates the outcome of the corresponding request, for example (from IETF RFC 3261):

1xx: Informational—request received, continuing to process the request;

2xx: Success—the action was successfully received, understood, and accepted;

3xx: Redirection—further action needs to be taken in order to complete the request;

4xx: Client Error—the request contains bad syntax or cannot be fulfilled at this server;

5xx: Server Error—the server failed to fulfill an apparently valid request;

6xx: Global Failure—the request cannot be fulfilled at any server.

Although any legitimate SIP response code may appear in this field, there is a significant subset that are further processed by and Interaction. This subset minimally contains the following status codes:

☐ HYPERLINK "http://edocs.bea.com/wlcp/wlss21/javadoc/sipservlet/javax/servlet/sip/SipServletResponse.html" \I "SC_ACCEPTED" ☐SC_ACCEPTED☐
Status code (202) indicating that the request has been accepted for processing, but the processing has not been completed.

☐ HYPERLINK "http://edocs.bea.com/wlcp/wlss21/javadoc/sipservlet/javax/servlet/sip/SipServletResponse.html" \I "SC_BUSY_EVERYWHERE" ☐SC_BUSY_EVERYWHERE☐
Status code (600) indicating that the callee's end system was contacted successfully but the callee is busy and does not wish to -continued take the call at this time
☐ HYPERLINK "http://edocs.bea.com/wlcp/wlss21/javadoc/sipservlet/javax/servlet/sip/SipServletResponse.html" \l "SC_BUSY_HERE" ☐SC_BUSY_HERE☐
    Status code (486) indicating that the callee's end system was contacted successfully but the callee is currently not willing or able to take additional call
☐ HYPERLINK "http://edocs.bea.com/wlcp/wlss21/javadoc/sipservlet/javax/servlet/sip/SipServletResponse.html" \l "SC_CALL_BEING_FORWARDED" ☐SC_CALL_BEING_FORWARDED☐
    Status code (181) indicating the call is being forwarded
☐ HYPERLINK "http://edocs.bea.com/wlcp/wlss21/javadoc/sipservlet/javax/servlet/sip/SipServletResponse.html" \l "SC_CALL_LEG_DONE" ☐SC_CALL_LEG_DONE☐
    Status code (481) indicating Call Leg/Transaction does not exist.
☐ HYPERLINK "http://edocs.bea.com/wlcp/wlss21/javadoc/sipservlet/javax/servlet/sip/SipServletResponse.html" \l "SC_DECLINE" ☐SC_DECLINE☐
    Status code (603) indicating that the callee's machine was successfully contacted but the user explicitly does not wish to or cannot participate
☐ HYPERLINK "http://edocs.bea.com/wlcp/wlss21/javadoc/sipservlet/javax/servlet/sip/SipServletResponse.html" \l "SC_MOVED_TEMPORARILY" ☐SC_MOVED_TEMPORARILY☐
    Status code (302) indicating that the callee has moved temporarily.
☐ HYPERLINK "http://edocs.bea.com/wlcp/wlss21/javadoc/sipservlet/javax/servlet/sip/SipServletResponse.html" \l "SC_OK" ☐SC_OK☐
    Status code (200) indicating the request succeeded normally.
☐ HYPERLINK "http://edocs.bea.com/wlcp/wlss21/javadoc/sipservlet/javax/servlet/sip/SipServletResponse.html" \l "SC_PAYMENT_REQUIRED" ☐SC_PAYMENT_REQUIRED☐
    Status code (402) indicating that the caller needs to make a payment.
☐ HYPERLINK "http://edocs.bea.com/wlcp/wlss21/javadoc/sipservlet/javax/servlet/sip/SipServletResponse.html" \l "SC_REQUEST_PENDING" ☐SC_REQUEST_PENDING☐
    Status code (491) indicating that the request was received by a UAS that had a pending request within the same dialog
☐ HYPERLINK "http://edocs.bea.com/wlcp/wlss21/javadoc/sipservlet/javax/servlet/sip/SipServletResponse.html" \l "'SC_REQUEST_TERMINATED" ☐SC_REQUEST_TERMINATED☐
    Status code (487) indicating that the request was terminated by a BYE or CANCEL request.
☐ HYPERLINK "http://edocs.bea.com/wlcp/wlss21/javadoc/sipservlet/javax/servlet/sip/SipServletResponse.html" \l "SC_SESSION_PROGRESS" ☐SC_SESSION_PROGRESS☐
    Status code (183) carries miscellaneous call progress information
☐ HYPERLINK "http://edocs.bea.com/wlcp/wlss21/javadoc/sipservlet/javax/servlet/sip/SipServletResponse.html" \l "SC_TRYING" ☐SC_TRYING☐
    Status code (100) indicating the server is trying to locate the callee.

connectResponse: contains the response (see field 7 above) data from the highest precedent SIP invitee. This is most often the data from the first invitee with which a successful dialog has been established. However, these contents are application dependent and in some circumstances the definition of "highest precedent" may lead to a different result.

connectDeliverable: a Map data structure containing arbitrary output defined by the resource which was connected to; in other words, a connection specific payload. The data type of the map entries is a string. An example is specific DTMF collected from a user during a "consider_connect" IVR or media server conversation with the end user.

CXDN Events

CXDN provides two kinds of inter-component communication events. One is Intentional Events that represent user intentions. The other is Coordinating Events that are used between Interaction Sequences, Interactions and Interaction Behavior implementing Service Building Blocks. Both kinds of events are sub-typed into different event types. These events are implemented in Cxf and are reusable across service designs and implementations.

Intentional Events

Intentional Events represent user intentions to alter his/her communication experiences. An Intentional Event is a translation of the user's gesture on their device (endpoint) into a formalized representation. These events trigger a particular Interaction Sequence or affect the flow of an already "in flight" Interaction Sequence. According to a preferred embodiment, three types of Intentional Events have been identified and developed but other types may be added.

Connect, Move, Notify and Terminate events correspondingly signify the user's intent to connect to a resource (endpoint), change connected resources, indicate a change in endpoint presence and terminate a connection. These events trigger Interaction Sequences to orchestrate a series of resource Interactions to achieve the intent.

Coordinating Events

A second class of events that are not related to user gestures, but are used to coordinate between Interactions are Coordination Events. Coordinating Events carry the message data payload (CxfContext) between components within an Interaction Sequence. They are passed between an Interaction Sequence and its Interactions. They pass through the calls to and from Interaction Behavior implementing Service Building Blocks. According to a preferred embodiment, the types of coordination event are: Context Event—used to pass contextual data between components prior to ultimate resolution of the intent; and Result Event—represents the realization of the user's intent.

Reuse

Service Building Blocks (SBB) are configurable with elective behaviour. Each SBB has an inherent characteristic or role but the specific operation performed by a SBB is determined by the context in which it is called. Consider an SBB that implements the "Consider Constraints" Interaction Behaviour. The SBB could invoke many different constraint expressions by means of selecting an appropriate common capability.

Common Capabilities are application neutral, context free interfaces to network resources. SBBs combine application-specific semantics (logic) i.e. internal processes with calls to external common capabilities in a way that provide services to the Application Building Block (ABB) layer, i.e.: the layer that hosts Interaction Sequences and Interactions.

Referring, once more, to FIG. 3, the SBB corresponding to Consider Connect Constraints Interaction Behaviour (12, 22) is shown by way of example. For the proposed 2-Way SAAS service, the Consider Out SAAS Connect Result SBB makes a call to Common Capability "eWallet" to clear/commit a charge for pre-pay and it makes a call to Common Capability "Credit". Conditionals within the SBB test which Common Capability call is appropriate by looking up Profile information for the service user in the Cxf Context.

According to a preferred embodiment, a constraint expression typically invokes a plain old Java object (POJO) method that in turns calls one or more Common Capability operations. The constraint expressions are applicable across many different Interactions and by extension many different services. Advantageously, the POJOs are reusable across different SBBs and, from the point of view of the SBB, all POJOs implement the same simple interface that accepts the Cxf-Context and returns CxfContext for processing or passing to the next POJO (as appropriate).

Configuration (Config Points)

Each SBB called by an Interaction Behavior may be configured at runtime (i.e. upon receipt of a call from the associated Interaction Behavior), by passing to the SBB configuration data that prescribe which constraints to execute. This provides a powerful way to achieve reuse of SBBs resulting in a relatively small collection of configurable (data-driven) SBBs. Configuration data can be passed during a call from an Interaction Behavior to a SBB, for example expressed in variables using XML. We refer to configuration data embedded in SBB calls as Configuration Points (Config Points).

The small inventory of SBBs could be evolved with zero effect on the Interactions by having the configuration data positively elect which expressions we wish to employ.

Processing the Cxf Context

Fields 51-59 of the Cxf Context structure 50, described above with reference to FIG. 6, are manipulated over the course of an interaction or interaction sequence. Fields 51-59 are set and read by various ones of the interaction behaviors 11-14 and 21-26 described above with reference to FIGS. 2a and 2b.

Example 1

Join Conference

The sequence of processing of Cxf Context structure 50 by the first two interactions 34, 36 in the part of the Join Conference interaction sequence 30 shown in FIG. 4 will now be described in detail, by way of example.

Initial Processing by the Join Conference Interaction Sequence 30:
1. The original SIP Invite is received by the interaction sequence via a Connect Event 32, and the EstablishContext interaction behavior is called.
2. The EstablishContext interaction sequence behavior (not shown) populates the originalRequest 51, productElementID 52 and userID 53 fields of Cxf Context structure 50 (see FIG. 6).
3. Control is returned to the Join Conference Interaction Sequence 30.
4. Join Conference Interaction Sequence 30 transfers control to Welcome Video Interaction 34, together with Cxf Context data structure 50.

Processing by Welcome Video Interaction 34:
1. Welcome Video Interaction 34 receives Cxf Context data structure 50 and calls EstablishTargetEndpoints interaction behavior 21 (see FIG. 2a);
2. EstablishTargetEndpoints interaction behavior 21 determines the sequence of connections (within the scope of the current Interaction) and populates targetEndpoints field 54 of Cxf Context data structure 50. The first entry in the linked map structure 54 is a reference to a media server which provides the welcome video for the conferencing service. The second entry is a reference to a server that provides an authorization service for the video conference service. Control is returned to Welcome Video Interaction 34;
3. Welcome Video Interaction 34 calls ConsiderConnect-Constraints interaction behavior 22. In this case there are no constraints and connectConstraints field 55 is empty;
4. Control is returned to Welcome Video Interaction 34 with Cxf Constraints data structure 50 (updated as appropriate);
5. Welcome Video Interaction 34 invokes ConsiderConnect interaction behavior 23 passing Cxf structure 50 through a Context Event;
6. ConsiderConnect interaction behavior 23 finds the address of the media server in the targetEndpoints field 54 of Cxf Connect data structure 50 and connects the user that sent the original SIP invite to the media server. The identity of the user is provided in UserID field 53 of Cxf data structure 50. Control is returned to Welcome Video Interaction 34, with the status of the attempt set in ConnectStatus field 57 of Cxf Connect data structure 50. The connection is achieved through normal SIP signaling. The original request/invite data (CxfContext.requestData) is used to create a new request/invite. Normal SIP signaling occurs. The CxfContext.connectStatus is set to the status code returned in the SIP response (200/OK for success). The response data is used to populate the CxfContext.responseData. The ConsiderConnect interaction behavior then calls back to the interaction.
7. Welcome Video Interaction 34 invokes Wait for Reply interaction behavior 24. Wait for Reply interaction behavior 24 handles the return of control from the media server upon completion of the greeting message and the collection of any required input from the user. Upon receipt of the reply, control is passed back to Welcome Video Interaction 34.
8. Welcome Video Interaction 34 invokes ConsiderResult interaction behavior 25. Generally, any relevant post-result processing occurs at this point; in the case of a successful connection, no processing occurs other than, perhaps, logging. Control is returned to Welcome Video Interaction 34.
9. Welcome Video Interaction 34 returns control to Join Conference Interaction Sequence 30 with the return result, contained in the fields of Cxf Context data structure 50, as described.

Further Processing by Join Conference Interaction Sequence 30:
1. Upon return of the result by Welcome Video Interaction 34, Join Conference Interaction Sequence 30 invokes the second interaction in the sequence, Select/Auth Conference Interaction 36, passing Cxf Context data structure 50.

Processing by the Select/Auth Conference Interaction 14:
1. Select/Auth Conference Interaction 36 is invoked and passed Cxf Context data structure 50, updated by the Welcome Video interaction 34;
2. Select/Auth Conference Interaction 36 invokes EstablishEndpoints interaction behavior 21, passing Cxf Context data structure 50;
3. EstablishTargetEndpoints interaction behavior 21 identifies the address of an authorization server for the Video Conference service from targetEndpoints field 54 of Cxf Context data structure 50. Control is returned to Select/Auth Conference Interaction 36, with Cxf Context data structure 50;
4. Select/Auth Conference Interaction 36 invokes ConsiderConstraints interaction behavior 22. No constraints exist in this case and control is returned to Select/Auth Conference Interaction 36.

5. Select/Auth Conference Interaction 36 invokes ConsiderConnect interaction behavior 23, passing the Cxf Context data structure 50; (or, in a possibly more efficient mode, a reference to the Cxf Context data structure).
6. ConsiderConnect interaction behavior 23 connects the SIP session of the user to the authorization server. The authorization server collects the UserID and any additional authorization or authentication information required for login to the service. Control is returned to Select/Auth Conference Interaction 36 which invokes WaitforReply interaction Behavior 24.
7. Simultaneously, ConsiderConnect interaction behavior 23 either validates the credentials of the user or invalidates the connection attempt, returning the appropriate status in ConnectResult field 56 and Connect Status field 57. In the event that the user's credentials were invalid, the ConnectResult field value is "Error" and the ConnectStatus field value is representative of the reason for the failure (see the SIP Status Codes above). For valid credentials, the field values are "OK" and "200", respectively. Control is returned to Select/Auth Conference Interaction 36 through WaitforReply interaction behavior 24.
8. Select/Auth Conference Interaction 36 invokes ConsiderResult interaction behavior 25;
9. Select/Auth Conference Interaction 36 returns the result to Join Conference Interaction Sequence 30.

Further processing by Join Conference Interaction Sequence 30:

1. Join Conference Interaction Sequence 30 assesses the result of the execution of Select/Auth Conference Interaction 36. In the case that the authorization was successful, Join Conference Interaction Sequence 30 invokes Wait for Host Video Interaction 38; otherwise the Thank You for Trying Video Interaction 40 is invoked.

Interaction Groups

Figure 7:
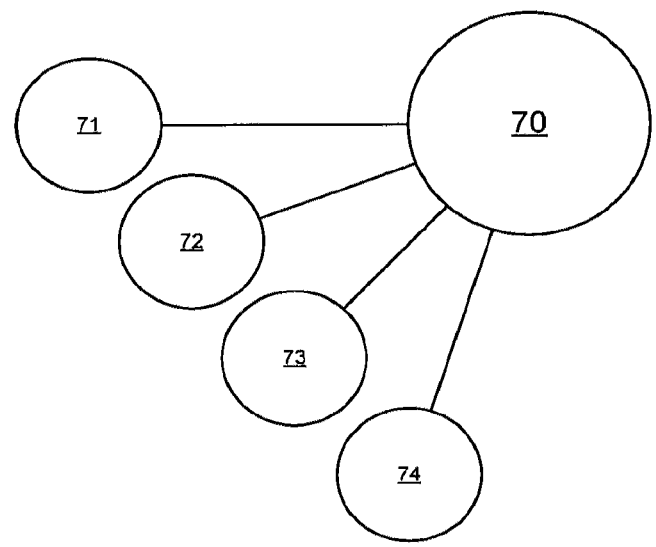
FIGS. 7 and 8 show a simplified representation of a multi-party communications service.

CXDN and CXf include semantics and mechanisms for the creation of sophisticated multi-party communication services. Example multi-party communication services are chat rooms and conference calls, as illustrated in FIG. 7. FIG. 7 shows a multi-party communications service 70 (e.g. hosting a conference or chat-room) in communication with a plurality of users in a communications network (participants 71-74). The invention is not limited to any particular form of multi-party service.

In CXDN, the multi-party entity is modeled as an agent called an Interaction Group. An Interaction Group is an agent that manages participation of multiple sessions or Interactions in a concurrent activity. The icon for an Interaction Group is a circle that contains a "list" element and a "process bubble" element, as shown in FIG. 1.

The list element of an Interaction Group signifies that it holds a list of Interaction instances as part of its state. Each of these Interactions relates to a step in a different interaction Sequence instance: in the example of the telephone conference, each Interaction will represent a different user. The Interaction Group "knows" about these Interactions and uses the list to do things like answer queries as to "who is currently in the conference?"; to broadcast messages to Interactions in the list, and so on. Notice that we say the Interaction Group maintains a list of Interactions—not Interaction Sequences. Interaction Sequences merely orchestrate Interactions that in turn do the actual work of user experience behavior. Interaction Groups interact with individual Interactions through the exchange of messages. In operation, an Interaction Group exchanges messages with Individual Interactions of the Interaction Sequences in its list. We describe this in detail later. The process bubble in the Interaction Group icon signifies that Interaction Groups have a lifecycle (i.e. a process with a beginning, intermediate activities and an end).

Figure 8:
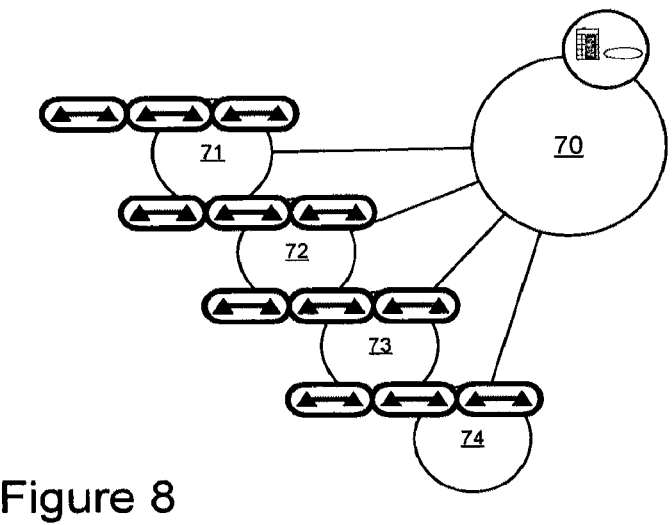

The techniques set out here allow the multiparty activity of FIG. 7 to be expressed, using CXDN, in terms of Interactions, Interaction Sequences and Interaction Groups. FIG. 8 shows the activity of FIG. 7 with CXDN notation added to identify the conference or chat-room 60 as an Interaction Group 70 and each participant process 61-64 as an Interaction Sequence 71-74.

Orchestration

Orchestration is a term that has come from the world of web services to refer to the way in which two or more web services can be strung together in the form of a workflow or business process. According to the present invention, each participant's experience of orchestration is represented as an Interaction Sequence agent that invokes the Interactions it comprises just like any Interaction Sequence.

Figure 9:
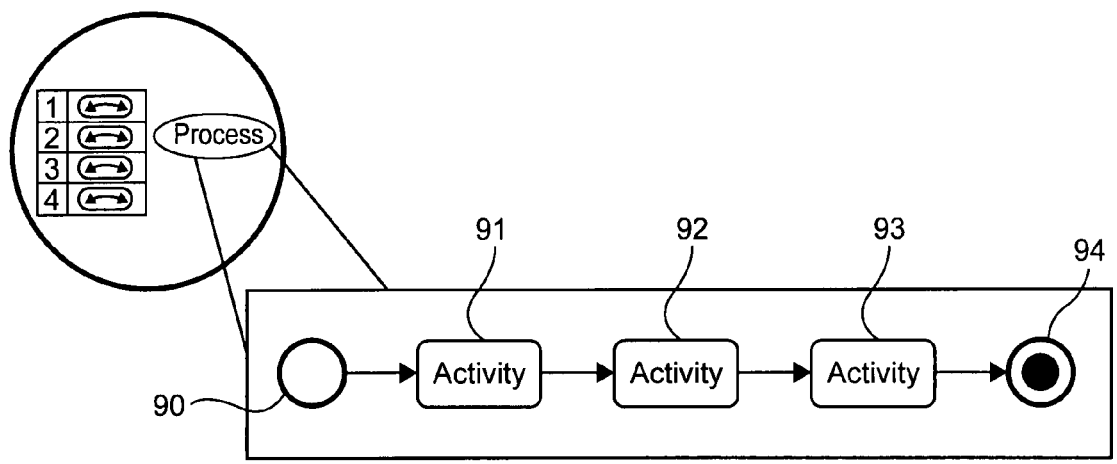
FIG. 9 shows a process in BPM notation.

As noted previously, the process bubble in the Interaction Group icon signifies that Interaction Groups have a lifecycle. This is a characteristic of multi-party control objects (such as conferences and chat rooms) which undergo stages and exhibit behavior. The present inventors have evolved how to exploit process technology to greatly simplify orchestrating this kind of lifecycle-oriented behavior. According to a preferred embodiment, the lifecycle process is modeled in BPMN and implemented in BPEL, as illustrated in FIG. 9. FIG. 9 indicates how the process bubble in an Interaction Group can be mapped onto a BPMN process flow. In FIG. 9, the BPMN process model comprises start 90 (open circle symbol) initiating sequence of activities 91-93 which terminate at endpoint 94 (filled circle symbol).

Choreography

For Interaction Groups and Interaction Sequences, CXDN supports the application of a process control flow pattern called choreography. Choreography as a general concept describes multiple software agents that exchange messages in ways that result in sophisticated system-wide behaviors. Choreography, as a process design discipline, has been applied by the BPM community to business-to-business (B2B) scenarios to describe such things as contractually agreed protocols between buyers and sellers in a negotiation. In the present invention, we apply choreography to the exchange of messages between the multi-party control object (the Interaction Group) and the individual participant control objects (the Interactions of the various Interaction Sequences).

Figure 10:
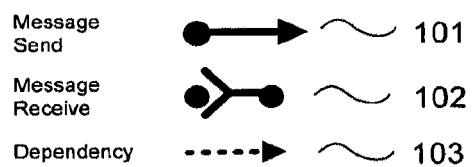
FIG. 10 shows CDL notation.

FIG. 10 shows a basic Choreography Description Language (CDL) notation. The notation of FIG. 10 conforms to Web Services Choreography Description Language (WS-CDL), an XML-based language that describes collaborations of Web Services participants by defining their common observable behavior; where ordered and synchronized message exchanges result in alignment of their shared information. A definition of WS-CDL can be found in *Web Services Choreography Description Language (WS-CDL)* 1.0, Nickolaos Kavantzas (Editor), Oracle Corporation, 2003.

We use a subset of the CDL notation here to describe the concepts of a sender sending a message, a receiver receiving a message, and a dependency between message sending and receiving. The dependency arrow (broken-line arrow 103 in FIG. 10) identifies the prerequisites for something to happen. It indicates that, for something to happen (i.e. the message send/receive action pointed to), another action must have happened previously (i.e. the message send/receive pointed away from). The message send and message receive actions are represented by solid black arrows with the message send arrow 101 having a dot at the start of a conventional arrow, whereas the message receive arrow 102 has a dot before an arrow tail and a second dot in place of the conventional arrow head.

A choreography described in WS-CDL expresses the sequence of and dependencies among messages that pass between agents which together constitute a contract of interaction (behavioral contract) between the agents. The internal operation of the individual agents (the Individual agent lifecycle process orchestrations that produce and consume the messages) is irrelevant to the behavioral contract of a choreography between agents. These individual orchestrations can be designed in any way as long as the choreography contract is adhered to. Advantageously, the new techniques set out here greatly simplify the multi-party service assembly process. By isolating the individual agent life cycle process logic from the multi-party control object logic, the task of designing and implementing multi-party communications services is made available to non-communications systems experts.

Furthermore, the new techniques set out here mean that each agent in a choreography can be designed independently of the other agents. Once the choreography contract is defined, different versions of each agent can be developed and reused, creating new services just by rearranging and combining existing components. Agents are reusable across different system-level designs. Alternative agent orchestrations may be combined to achieve different results (e.g. different services).

For the purposes of illustration, we propose a simple, two-party service creation environment comprising two agents linked by a choreography. Each agent implements behavior on behalf of a different party. Applying the invention to the service creation environment results in a modular arrangement in which it is possible to alter the behavior of the system in a simple and well-controlled way. For example, the system may be altered by substituting a new implementation of one of the original agents. The new system will behave differently overall through the use of the alternative implementation of the agent implementing behavior of a first party. According to an exemplary embodiment, this change does not affect the other agent implementing behavior of a second party or the message protocol between two agents which remain the same.

Another way of thinking about this is that the choreography determines the coordination or rendezvous points between cooperating processes. The coordination points remain constant across alternative system-level designs with only the internal workings of the agents changing. The impact of the use of a consistent choreography in multi-party communication service designs, such as chat rooms and conference calls, is that communication services can be produced to support different user experiences by just mixing and matching the interchangeable components of Interactions, Interaction Sequences, and Interaction Groups. Each agent can be replaced by a different agent (or a different version of the same agent). We demonstrate this kind of flexibility for an Interaction Group at the end of this section.

A CXDN Multi-Party Service Example

Example Overview

Figure 11:
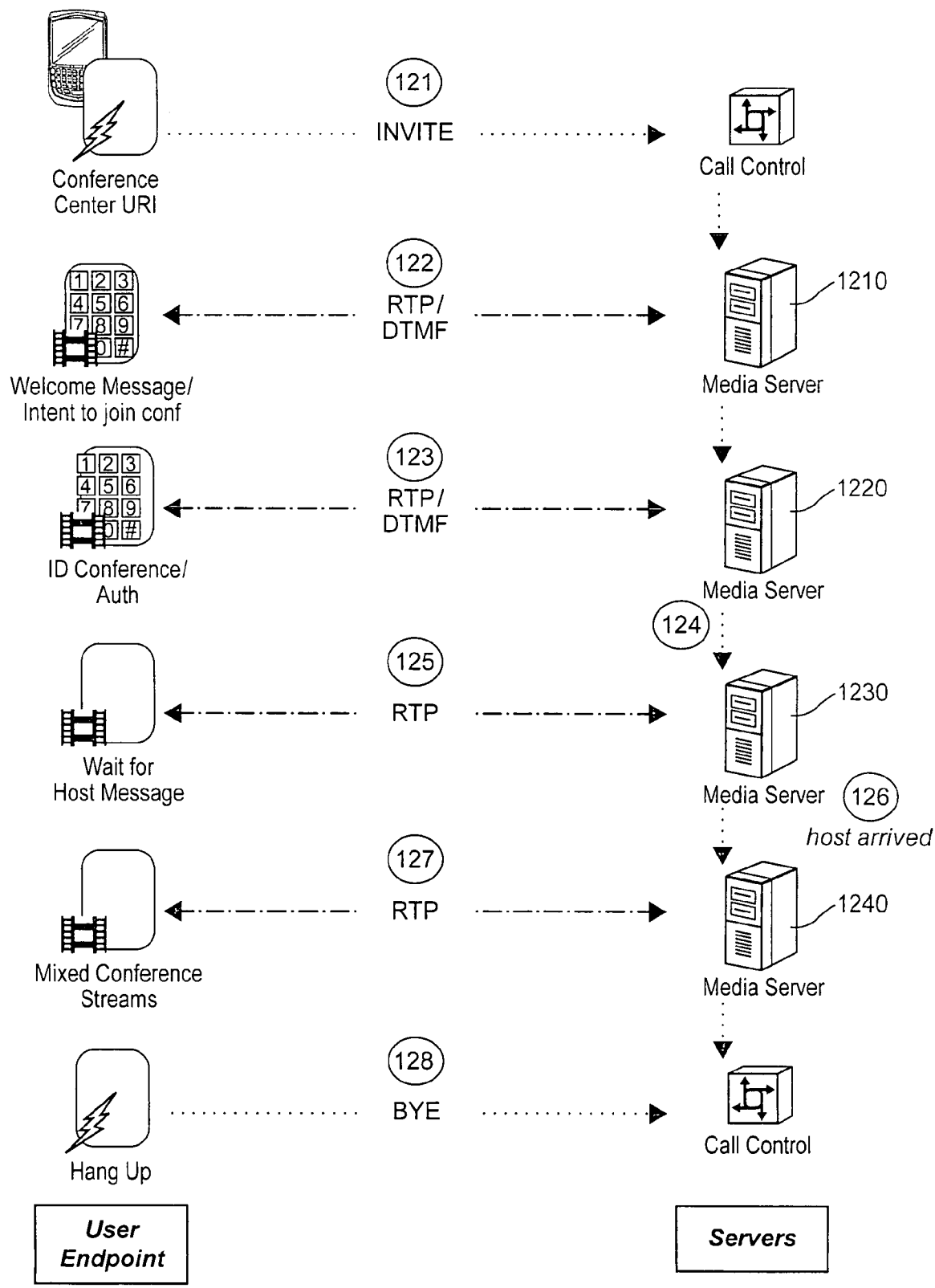
FIGS. 11 to 17 show various aspects of multi-party communication services.

To further demonstrate these concepts, we introduce a simple, commonplace multi-party communication service example. Consider a conferencing service where individual participants join a conference that begins when the host arrives. In this example, the multi-party communication service comprises a number of stages, as illustrated in FIG. 11. FIG. 11 shows, to the left, a sequence of actions at a user endpoint and, to the right, a corresponding sequence of actions at various servers. A series of numbered arrows between the user endpoint and the various servers represent exchanges of messages at various stages of the service, as follows:

121. User dials the conference center (INVITE);
122. The User is initially streamed a welcome message by a media server and indicates its intent to join a conference (RTP/DTMF);
123. The User is prompted for and provides the conference ID and authorization code (RTP/DTMF);
124. The media server accepts the participant on behalf of the conference (this example illustrates only a happy path acceptance);
125. A "wait for host arrival" message is then streamed to the user (RTP);
126. The host arrives;
127. The media server then accepts the audio stream from the user endpoint (and from other users, not shown), mixing audio streams from each accepted participant and streaming back to the users the mixed conference audio (RTP);
128. At some point the participant drops out of conference by issuing a further message (BYE).

We shall first model the Interaction Sequence for an individual Participant, e.g. participant 71 in FIG. 7. As an example, we take the Join Conference Interaction Sequence already described in part, above, with reference to FIG. 4 and described more comprehensively below, with reference to FIG. 12. The complete Join Conference Interaction Sequence of FIG. 12 realizes the experience scenario of participant 71 joining the conference 70 in FIG. 7. As in FIG. 4, FIG. 12 Illustrates the Join Conference Interaction Sequence using the CXDN notation.

Figure 12:
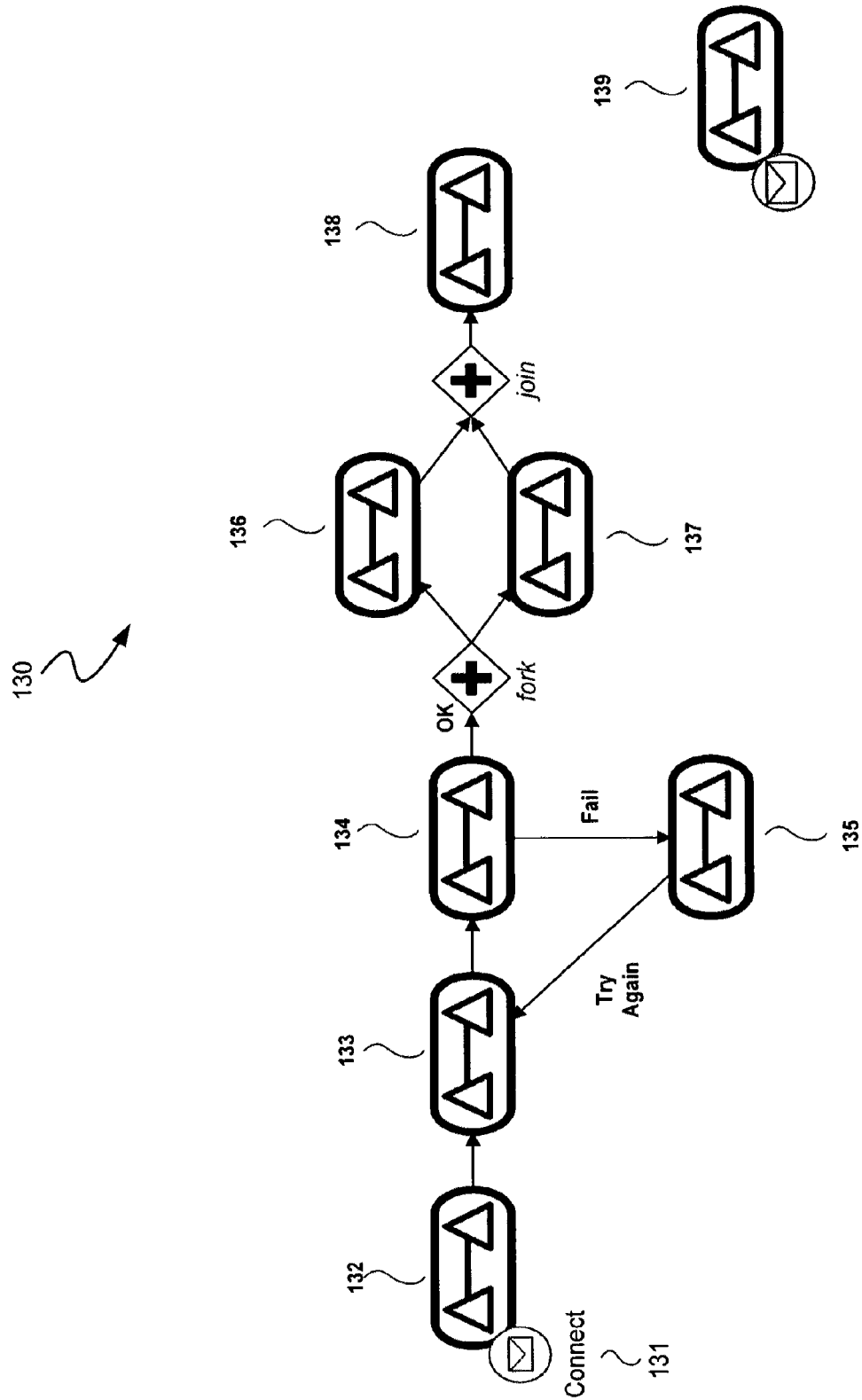

We shall briefly trace the paths through the Interaction Sequence of FIG. 12 with reference to the messages exchanged in the multi-party communication service of FIG. 11. In FIG. 12, Interaction Sequence 130 is invoked (via Connect Event 131) upon receipt of the INVITE SIP message 121 from the user (not shown). The first Interaction "Welcome to Conference Center Audio" 132 acts to connect the conference participant to a media server 1200 and to stream a "welcome" audio through RTP 122 to the user's device. In this, first Interaction 132, the media server connection also includes programming to conduct a peer-to-peer conversation with the user to collect DTMF data to capture the user's intent. In this example, the user indicates their intent to join a conference.

The next Interaction in the sequence "Connect Conference ID/pwd DTMF" 133 connects the user to a media server 1220 where the Conference ID and password are checked. This corresponds with step 123 of FIG. 11. As with the first Interaction 132, the user and media server conduct a peer-to-peer conversation 123 and the result of the conversation will be the transfer to the media server 1220 of collected DTMF data indicating the user's conference ID and password.

From here, Interaction Sequence 130 transitions to the "Ask permission to Add Interaction to Conference" Interaction 134. This Interaction 134 connects to a conference agent (discussed below) and asks permission for the user to join the multi-party call. From this Interaction 134 we get a connect result message of "OK" or "fail". In case of a failure, the path diverts to "Announcement of invalid conference ID/password" Interaction 135 which invokes "Connect Conference ID/pwd DTMF" 133, described above to allow the user to reenter their details.

Following the happy path, two Interactions 136, 137 are initiated simultaneously, as indicated by the first plus symbol in FIG. 12 following the "Ask permission" Interaction 134. The plus symbol is a BPMN symbol indicating the forking of parallel (AND) control flow. The upper Interaction in the fork "Field Connect Request" 136 registers itself with the conference and waits for the conference to call back to indicate that it is time to connect the user to the conference media stream (e.g. upon arrival of the conference host). The lower Interaction in the fork "Waiting for Host Audio" 137 connects the user to a media server 1230 so that audio may be streamed 125 to the user while waiting for the host the media server 1230 connected by the "Waiting for Host Audio" Interaction 137 is not programmed to collect any DTMF data and therefore control returns immediately from this Interaction 137 to the Interaction Sequence 130 which proceeds to the second plus symbol, a BPMN symbol indicating the joining of forked control flow.

Once the connect-request callback is received by the upper of the forked Interactions, "Field Connect Request" 136, ie., notifying arrival of the host (corresponding with step 126 of FIG. 11), the Interaction sequence 130 ANDs (joins) the two forks and proceeds to the "Connect to Conference Stream" Interaction 138. "Connect to Conference Stream" Interaction 138 connects the user's endpoint to a media server 1240 where all the incoming voice streams are mixed and then streamed back 127 to the participants" devices. The user is now in the conference call and the Join Conference Interaction Sequence is complete.

At some point, the user will drop out of the call. At this stage, the user's endpoint sends a BYE SIP message 128. This causes an Interaction separate from the sequence, "Drop out of Conference" 139, to trigger. In this, separate, "Drop out of Conference" Interaction 139, the user is removed from the conference agent's record of participants. Media servers 1210-1240 could be implemented as either a single server or a plurality of servers.

The Conference Interaction Group Agent

Next we describe the Conference Agent. In the CXDN notation, the conference, described above, like the Interaction Sequences and Interactions it comprises, is represented as an agent whose lifecycle is implemented in BPEL. The conference is an example of a CXDN agent called an Interaction Group. An Interaction Group acts in concert with the Interactions of the Interaction Sequences that make up the Interaction Group.

Figure 13:
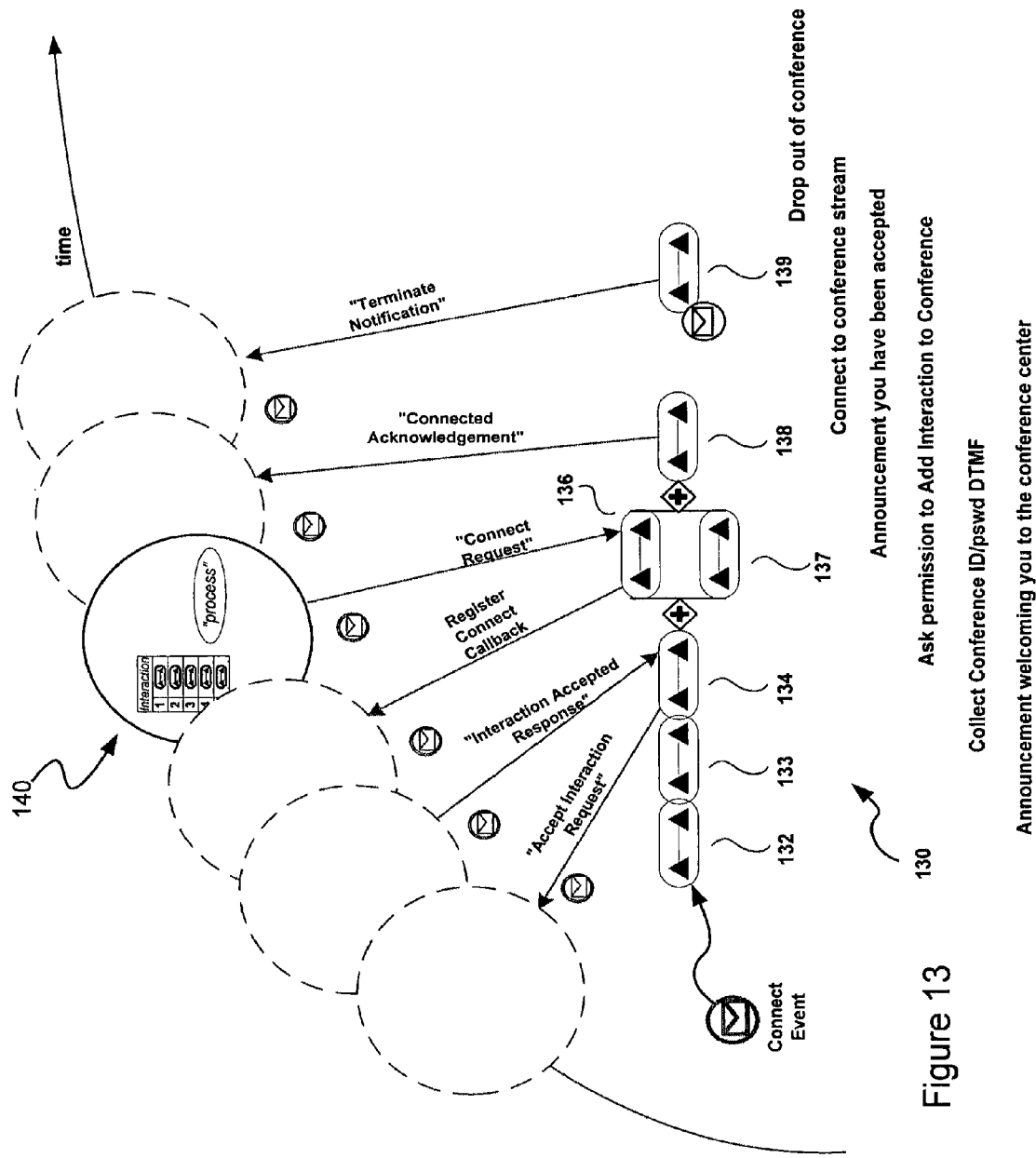

In FIG. 13, the Interaction Group relating to the above-described conference call is shown, at the top of the Figure, in a schematic time sequence illustrating stages in its lifecycle over time. A time line is indicated by the curved arrow passing behind a plurality of stages (represented by circles) of a single Interaction Group 140 at successive time intervals along the time line. The current time is indicated by a solid circle with earlier and future stages indicated by broken circles. At the bottom of the Figure is the "Join Conference" Interaction Sequence 130 described above with reference to FIG. 12. FIG. 13 shows the Interaction Sequence 130 progressing through its Interactions 131-138 and separate Interaction 139 in tandem with the successive stages of the Interaction Group 140. Only the happy path is shown and Interaction 135 is consequently omitted. Each Interaction 131-139 is annotated in the Figure, underneath, with an action linked to that Interaction. Notice that only four out of the seven Interactions of the Interaction Sequence (viz: 134, 136, 138 and 139) send or receive messages to the Interaction Group 140. As noted earlier, the process element of the Interaction Group icon signifies that the Interaction Group has a process orchestration (life cycle). The life cycle process of the conference Interaction Group in our example is further illustrated in FIG. 14.

A Scheduled Conference Call Life Cycle

Figure 14:
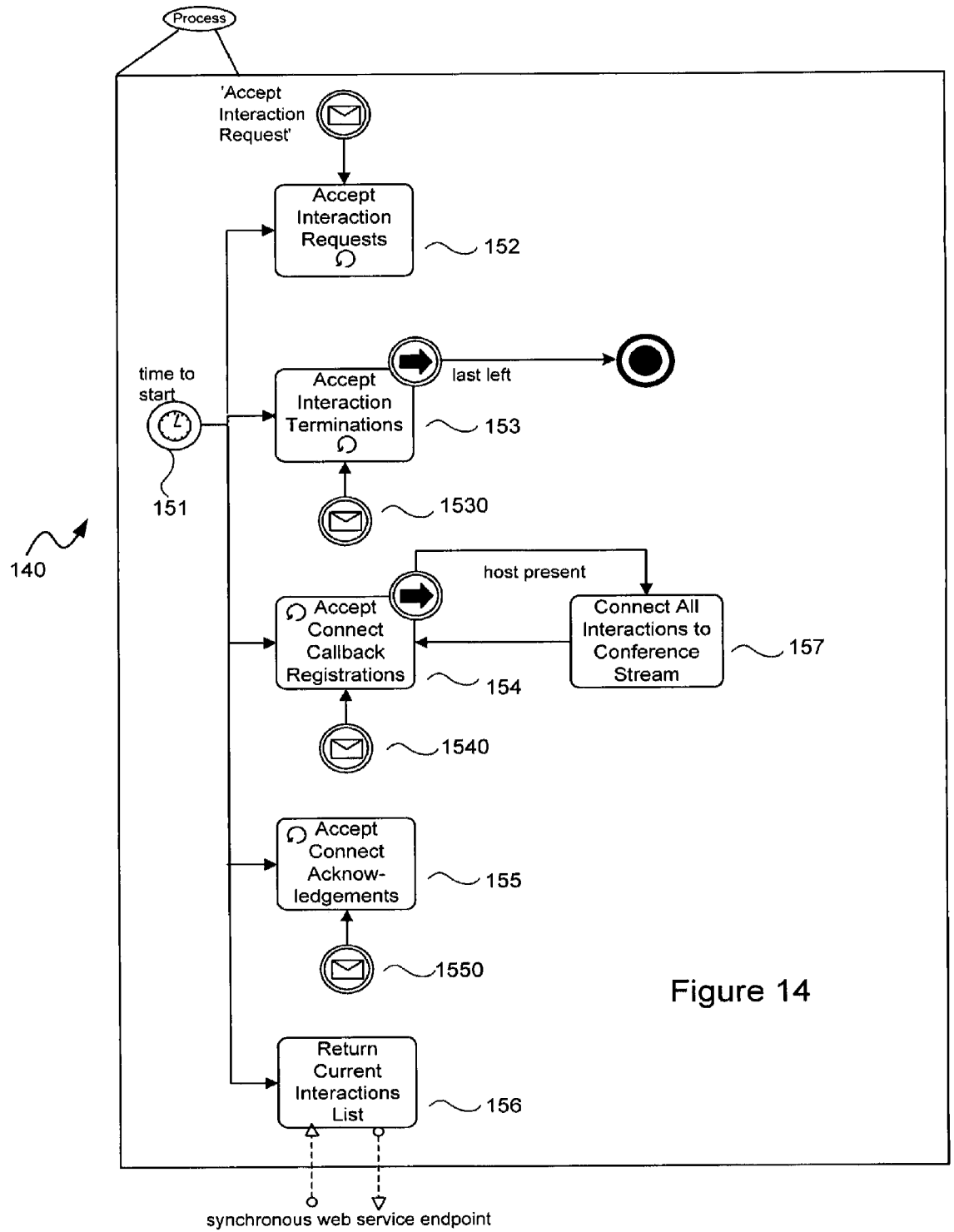

FIG. 14, shows a Business Process Modeling Notation (BPMN) model of a Business Process Execution Language (BPEL) process that represents the life cycle of the conference Interaction Group 140. The Interaction Group 140 begins at the left of the Figure with a timer 151 that fires at the time set for the conference to begin. After the timer 151 has fired, the process model forks, as indicated by the arrows leading from timer 151 to five parallel activities 152-156 which are then invoked.

These five parallel activities are: "Accept Interaction Requests" 152, "Accept Interaction Terminations" 153, "Accept Connect Callback Registrations" 154, "Accept Connect Acknowledgements" 155 and "Return Current Interactions List" 156. Of these five activities, three have additional intentional event inputs. "Accept Interaction Terminations" activity 153 has as input "Interaction Termination Request" event 1530. It monitors the number of participants left in the conference and terminates once the last participant has left (or, in a hosted conference, once the host has left). "Accept Connect Callback Registrations" activity 154 has as input "Connect Callback Registration" event 1540. It accepts request to join the conference and, in a hosted conference, marks the host joining the conference by invoking "Connect all Interactions to Conference Stream" activity 157. "Accept Connect Acknowledgements". Activity 155 has as "input Connect Ack" event 1550 indicating each participant as it joins the conference.

Each of these activities 152-156 opens up a port to receive messages from external agents (in this case, Interactions 134, 136, 138 and 139). Referring back to FIG. 13, it is evident that the Interaction Sequence model 130 works in conjunction with (is choreographed with) the Interaction Group process model 140 of FIGS. 13 and 14. This choreography will be discussed in considerable detail shortly. Each of the parallel activities of Interaction Group 140 shown in FIG. 14 relates to a different stage of the Interaction Sequence 130 of FIG. 13. In fact, Interaction Sequence 130 is representative of a plurality of similar Interaction Sequences operating in parallel and coordinated with the Interaction Group 140. Each of the five parallel activities 152-156 interacts with the plurality of Interaction Sequences (only one of which, 130, is shown).

Most of the Interaction Group process activities are implemented as Service Building Blocks (SBBs), described above, in Java or C#. An exception to this is "Accept Interaction Request(s) 152 which can be implemented as a further called-process implemented in BPEL (see below).

Figure 15:
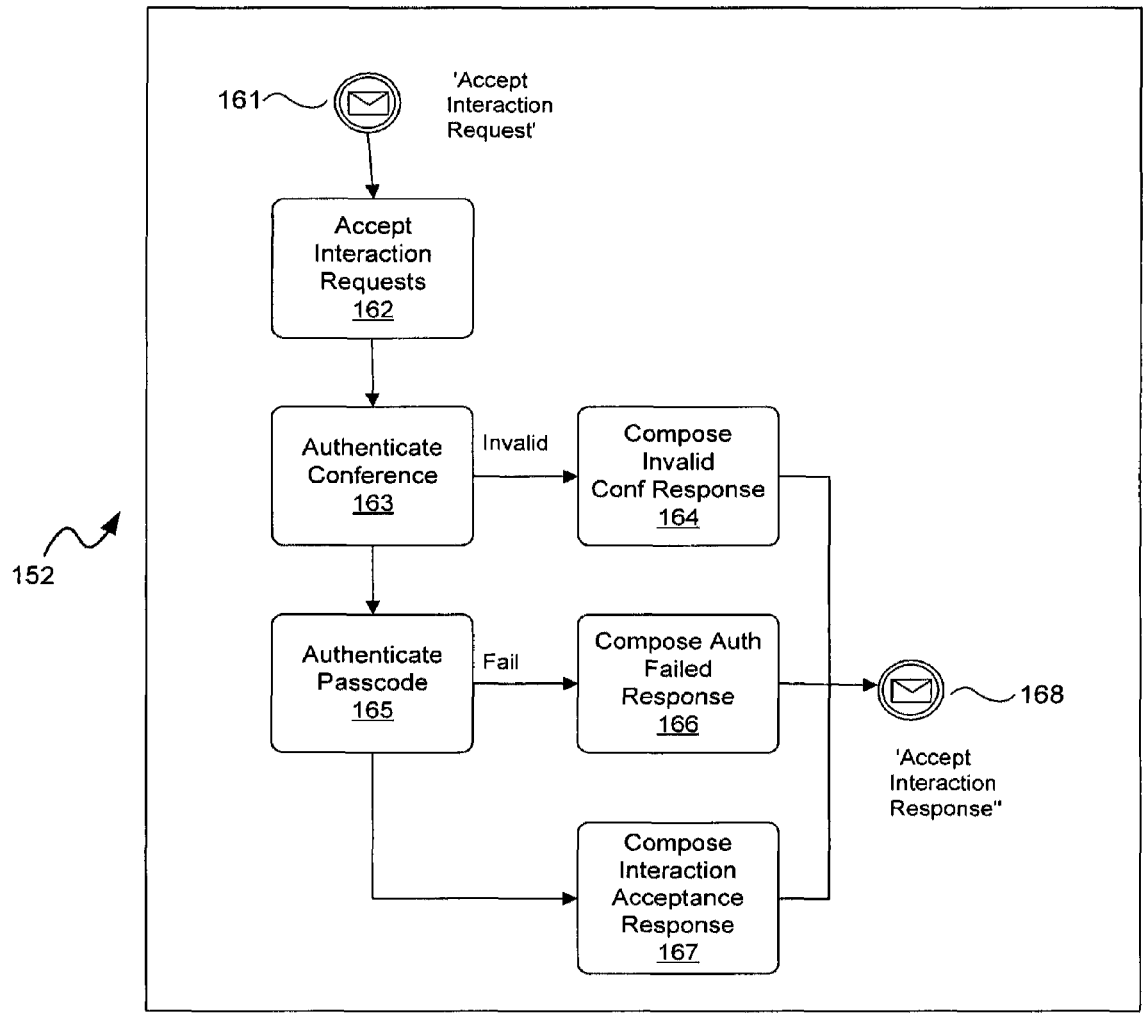

FIG. 15 shows the Accept Interaction Request(s) activity 152 of conference Interaction Group 140 in more detail. As shown in FIG. 15, the Accept Interaction Request(s) activity 152 comprises six interconnected functional blocks, 162-167 as follows.

The Accept Interaction Requests functional block 162 is a BPEL receive activity that receives "Accept Interaction Request" produced by "Ask Permission" Interaction 134. The Accept Interaction Requests functional block 162 feeds into the Authenticate Conference functional block 163. In the present example, the action relates to joining a conference call so the "Accept Interaction Request" could be re-labeled "Join Conference Request'.

The Authenticate Conference functional block 163 verifies that the participant conference ID provided by the "Ask Permission" Interaction 134 is valid. If it is invalid, The Authenticate Conference functional block 163 invokes the "Compose Invalid Conference Response" functional block 164. The "Compose Invalid Conference Response" functional block 164 creates an "Invalid Conference Response" message and transitions to the "Accept Interaction Response" BPEL reply functional block 168—an activity that sends the "Invalid" response to the calling Interaction 134. If the participant's conference ID is valid, The Authenticate Conference functional block 163 invokes the Authenticate Passcode functional block 165.

The Authenticate Passcode functional block 165 verifies that the participant-entered conference passcode, provided by the "Ask Permission" Interaction 134, is correct. If the passcode received is invalid, "Compose Auth Failed Response" functional block 166 is invoked. This functional block creates an "Auth Failed Response" message and transitions to the "Accept Interaction Response" BPEL reply functional block 168 which sends the response to the calling Interaction 134.

If both "Authenticate Conference" and "Authenticate Passcode" functional blocks 163, 165 receive valid inputs, the Authenticate Passcode functional block 165 invokes the "Compose Interaction Acceptance Response" functional block 167. This functional block creates an "Interaction Acceptance Response" and transitions to the "Accept Interaction Response" BPEL reply functional block 168 which sends the response to the calling Interaction.

A Variation on the Conference Example

Figure 16:
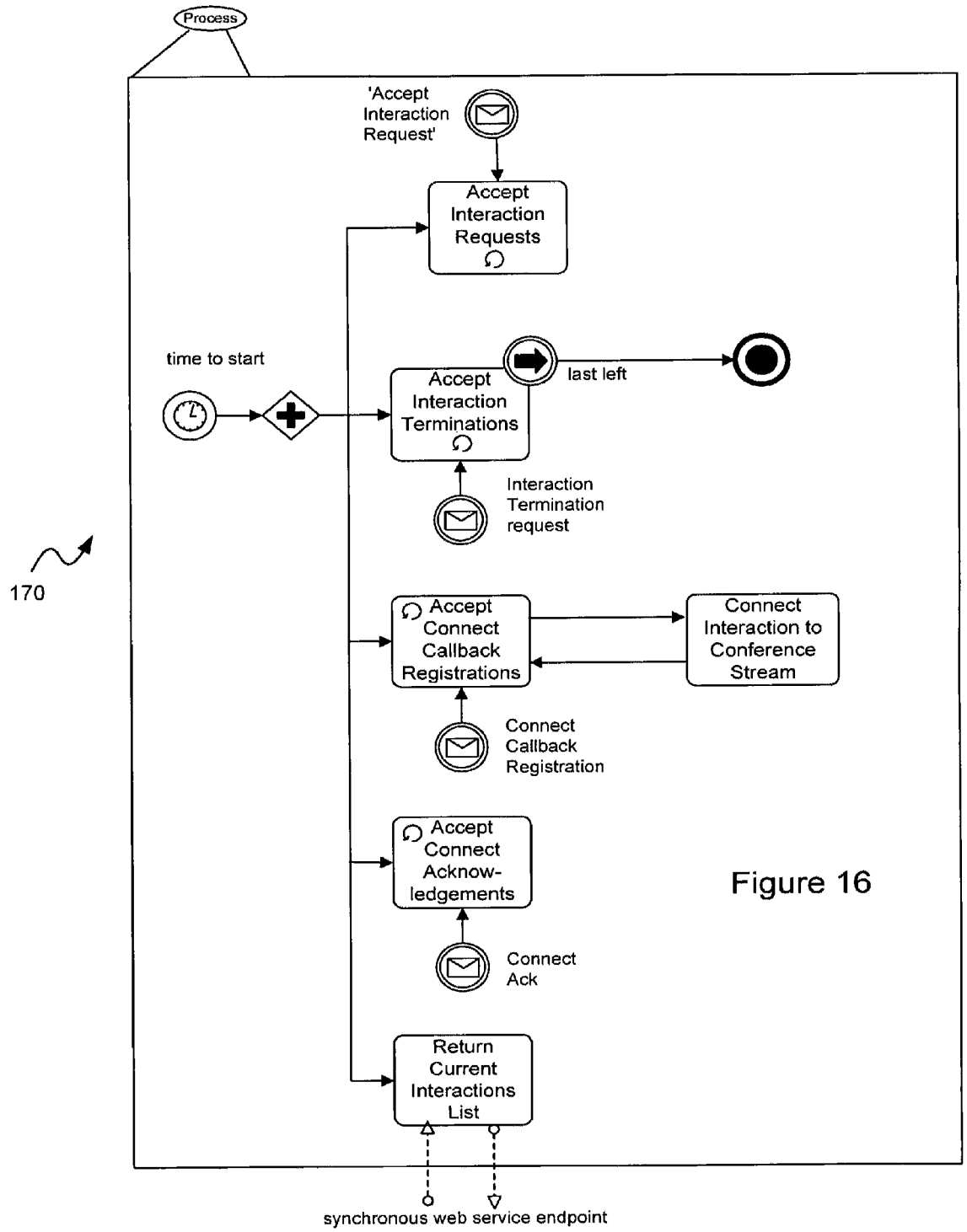

Next, we consider an alternative implementation for the Conference Interaction Group of FIGS. 14 and 15. The choreography of messages remains the same as in the initial example and the participant Interaction Sequence 130 is not changed. However, a different service is realized and the effect will be a different experience on behalf of the participants. FIG. 16 shows a Business Process Modeling Notation (BPMN) model of a Business Process Execution Language (BPEL) process that represents the life cycle of a second conference Interaction Group process 170. Unlike the original example, in second conference Interaction Group 170, no participant is designated as host. The only operational difference between the original conference Interaction Group process 140 and new conference Interaction Group process 170 is that when a connect callback registration is received from the participant Field Connect Request Interaction 136 (FIG. 13), a Connect Request message is immediately sent back to Interaction 136 and the Connect to Conference Stream Interaction 138 issues "Connected Acknowledgement" message. As the host's presence is not a pre-condition for conferencing to take place, conferencing will occur immediately for any participant coming into the conference. In practice, the Waiting for Host audio announcement could stream momentarily if system latency occurs. In a more sophisticated design, it would be possible to bypass this step through connect constraints. Advantageously, application of the techniques taught here greatly simplifies the process of changing the conference call service.

Figure 17:
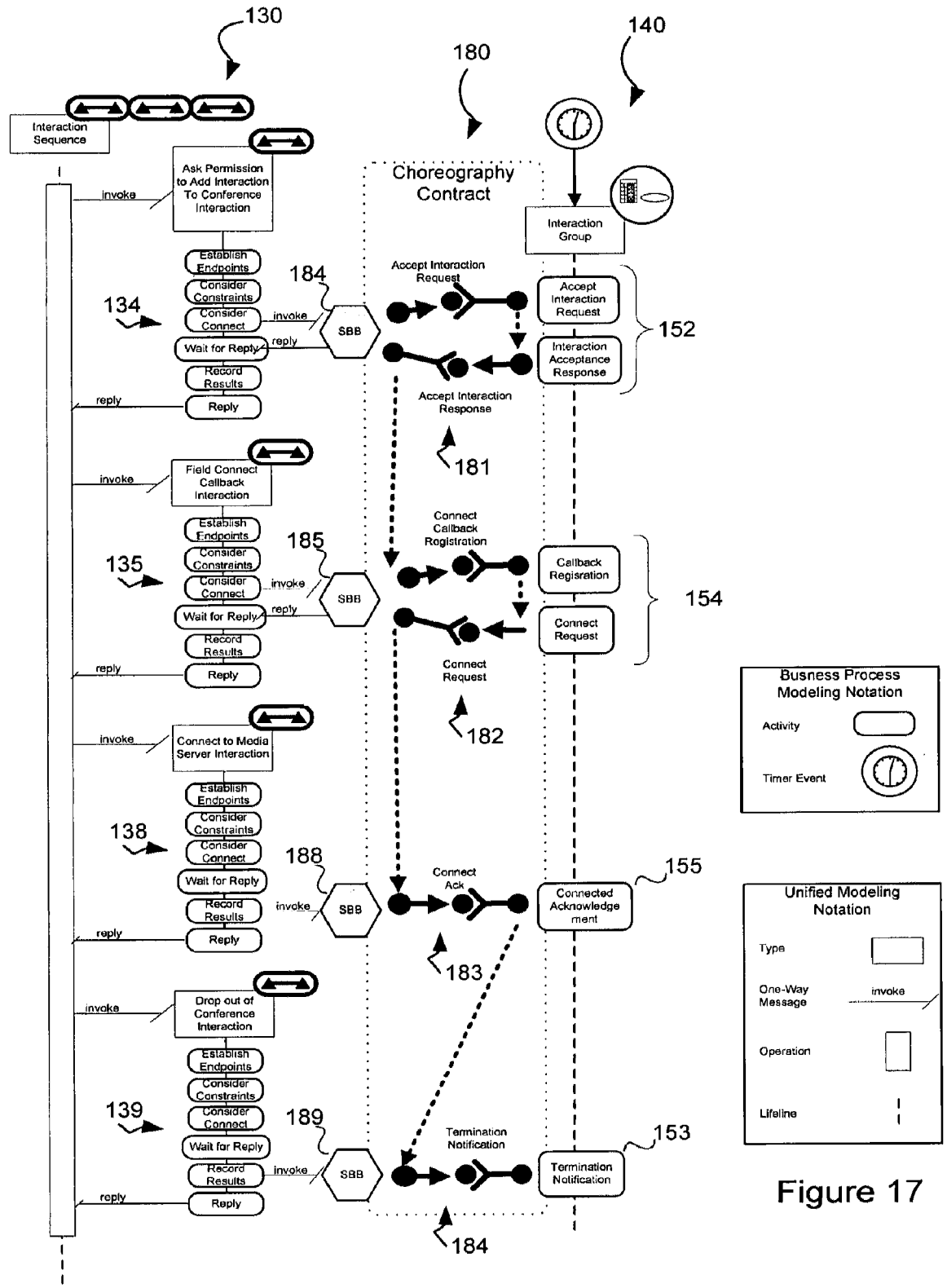

Next we describe the choreography of messaging between Interaction Groups and Interactions with reference to FIG. 17. FIG. 17 shows a detailed representation of the multi-party communications service, discussed previously. At the left hand side we have Interaction Sequence 130 (representing, in reality, a plurality of Interaction Sequences) comprising the series of Interactions 134, 136, 138 and separate Interaction 139 supporting a user's interaction with the multi-party communications service supported by Interaction Group 140. Interactions 132, 133, 135 and 137 of Interaction sequence 130 that do not interact with Interaction Group 140 are not shown here for clarity. At the right hand side, Interaction Group 140 coordinates the interaction between the many users and the multi-party communications service. Running down the centre, between these two, we have a representation of the choreography contract 180 between the Interactions and the Interaction Group. The choreography contract 180 is represented in the Figure using a variant of the WS-CDL graphical notation.

Although only a single, representative Interaction Sequence is shown, it is important to recognize that multiple/simultaneous Interaction Sequence instances are executing for a given Interaction Group instance. The use of BPEL manages the concurrency of access to the Interaction Group 140, inherently preventing data corruption of state in the Interaction Group. The BPEL runtime can be configured to queue requests to a process instance and field one at a time. We shall now describe the various parts of FIG. 17 in more detail, starting with the choreography contract 180.

The choreography 180 of messaging between Interactions 134, 136, 138 and 139 in Interaction Sequence 130 and an Interaction Group 140 comprises four message exchanges that occur in the order shown from the top to bottom in the Figure. The first exchange 181 is bidirectional and comprises Interaction 134 sending an "Accept Interaction Request" message to the Interaction Group 140 (Accept Interaction Request functional block 152) that in turn sends back an "Accept Interaction Response" message.

The second exchange 182 comprises Interaction 135 of the Interaction Sequence 130 sending a "Connect Callback Registration" message to the Interaction Group 140 ('Accept Connect Callback Registrations" 154). The Interaction Group 140 adds the identity of the calling Interaction to the Interaction Group's list of Interactions requesting access to the conference. When appropriate, the Interaction Group 140 ('Accept Connect Callback Registrations" 154) sends a "Connect Request" message back to the Interaction 135 and removes the callback registered Interaction from the list.

The third exchange 183 comprises Interaction 138 of the Interaction Sequence 130 sending a "Connect Ack" acknowledgement message to the Interaction Group 140 ('Accept Connect Acknowledgements" 155) which in turn adds the Interaction instance to the list.

The fourth exchange 184 comprises Interaction 139 separate from Interaction Sequence 130 sending a "Termination Notification" message to the Interaction Group 140 ('Accept Interaction Terminations" 153) which in turn removes the Interaction from the list.

Each of the second and subsequent message exchanges 182-184 is dependent on the previous exchange occurring.

We now turn to the individual Interactions within the Interaction Sequence, represented at the left of the Figure. These are the three Interactions 134, 136, 138 of the Join Conference Interaction Sequence 130 and separate Interaction 139; discussed earlier, that exchange messages with the Interaction Group 140. Each Interaction Sequence 130 comprises further Interactions (i.e. 132, 133, 135 and 137) which do not exchange messages with the Interaction Group 140 and these, non-messaging Interactions are not shown in FIG. 17. We now consider detailed behavior at the level of Interaction Behaviors operating within each of the four messaging Interactions 134, 136, 138 and 139.

The first messaging Interaction in the Interaction Sequence "Ask permission to add Interaction to conference" 134 sends a message to a port opened by the Interaction Group 140 for the "Accept Interaction Request" message. The "Accept Interaction Request" message is asynchronously sent from the Service Building Block (SBB) 184 implementing the Connect behavior of the "Ask permission to add Interaction to conference" Interaction 134. The "Interaction Accepted Response" message is fielded by the Connect-implementing SBB 184 and is relayed back to the first Interaction 134 via that Interaction's "Wait for Reply" Interaction Behavior. As illustrated in FIG. 12, at this point the Interaction Sequence 130 forks two parallel Interactions 136, 137. As shown in FIG. 12, it is the upper Interaction "Field Connect Request" 136 of the parallel Interactions which interacts with the Interaction Group 140, sending a message ('Register Connect Callback') to the Interaction Group 140 identifying itself to the Interaction Group 140 as the Interaction to send the "Connect Request" message to once the host arrives. These two messages (i.e. "Register Connect Callback" and "Connect Request") are handled (sent/received) by the SBB 184 implementing the Interaction's Connect behavior.

When the host arrives (see the "host arrived event transition 126 of FIG. 11) Interaction Group process 140 invokes "Connect all Interactions to Conference Stream" activity 157. The implementation of this activity iterates over the Interaction list held in the Interaction Group state and sends "Connect Request" messages to Interaction instances previously registered through the "Register Connect Callback" messages. Each Join Conference Interaction Sequence instance (one per participant) then transitions to its "Connect to conference stream" Interaction 138 and invokes it.

"Connect to conference stream" Interaction 138 connects to the media server port for the conference (shown in FIG. 11) through SBB 188 implementing its Record Results behavior. It then sends a "Connect Ack" acknowledgement message to Interaction Group 140 which, in turn, records the calling Interaction instance in its list. These entries in the list represent who is in the conference.

When the participant endpoint "hangs up" it sends a SIP BYE request. This causes "Drop out of Conference Interaction" 139 to be invoked. SBB 189 implementing this Interaction's "Record Results" behavior sends a "Termination Notification" message to the Interaction Group 140. The Interaction Group 140 receives the "Termination Notification" and "Accept Termination" activity 153 removes the Interaction originally recorded upon receipt of the "Connect Ack" message.

Although described here with reference to a specific example of a multi-party communications service, the inventors have found that the above, four-part choreography 180 has general application in the field of multi-party communication services. Advantageously, each side of the choreography can be varied independently of the other. This means that the Interaction Sequence 130 can be changed and new forms developed and implemented without impacting on the design of the choreography or the Interaction Groups. Similarly, the Interaction Group 140 can be changed and new forms developed and implemented without impacting on the design of the choreography or the Interaction Sequences. This brings the benefit of reusability across complete service designs (the ability to mix and match parts at a coarse-grained level).

Interaction Groups are agents susceptible of design in CXDN that adhere to a contract of message exchanges with Interactions. Their process life cycle is not formalized in CXDN but the choreography of message exchange is. The invention supports the design of Interaction Groups that are reusable across different applications and media (for example: audio, video and text). The invention also supports the re-use of Interaction Sequences, Interactions, and Interaction groups in different combinations in a modular fashion achieving different system wide behaviors.

SAA may be viewed as a tool, which facilitates the creation of new combinations and permutations of stock software objects, these stock software objects being elements of control and configuration for services in a communications system. This does not exclude the application of SAA to newly created software objects. The services so defined are in the form of new operations implemented in the working system (HW and SW) of an existing communications services platform and the custom-designed software objects implementing the operations.

Those skilled in the art will appreciate that the above embodiments of the invention are simplified. Those skilled in the art will moreover recognise equivalents to the features described in each embodiment and that it is possible to incorporate features of one embodiment into other embodiments. Where known equivalents exist to the functional elements of the embodiments, these are considered to be implicitly disclosed herein, unless specifically disclaimed. Accordingly, the spirit and scope of the invention is not to be confined to the specific elements recited in the description but instead is to be determined by the scope of the claims, when construed in the context of the description, bearing in mind the common general knowledge of those skilled in the art.

The skilled person will recognise that the above-described apparatus and methods may be embodied as processor control code, for example on a carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus, the code may comprise conventional programme code or microcode or, for example code for setting up or controlling an ASIC or FPGA. The code may also comprise code for dynamically configuring re-configurable apparatus such as re-programmable logic gate arrays. Similarly, the code may comprise code for a hardware description language such as Verilog™ or VHDL (Very high speed integrated circuit Hardware Description Language) or industry equivalents. As the skilled person will appreciate, the code may be distributed between a plurality of coupled components in communication with one another, e.g. servers and user processing platforms.

Figure 18:
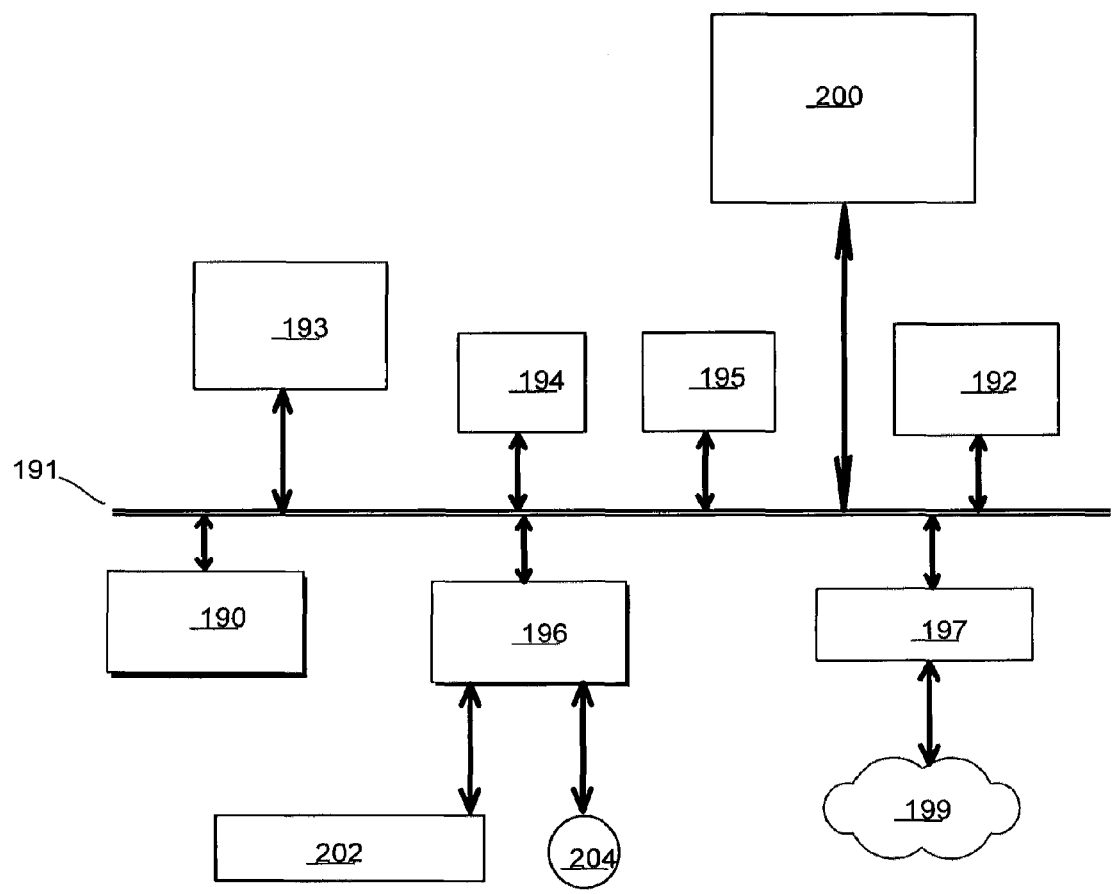
FIG. 18 shows a conventional processing device.

FIG. 18 shows a typical architecture for processing means suitable for implementing the service assembly architecture according to a further embodiment of the invention. In practice, a number of such means will typically be required. The processing means comprises a central processing unit (CPU) 190 for executing software programs and managing and controlling the operation of the processing means. The CPU 190 is connected to a number of devices via a bus 191, the devices including a first storage device 192, for example a hard disk drive for storing system and application software, a second storage device 193 such as a floppy disk drive or CD/DVD drive for reading data from and/or writing data to a removable storage medium and memory devices including ROM 194 and RAM 195. The computer further includes a network interface 197 for interfacing to a network 199. The computer can also include user input/output devices such as a mouse 204 and keyboard 202 connected to the bus 191 via an input/output port 196, as well as a display 200. It will be understood by the skilled person that the above described architecture is not limiting, but is merely an example of typical processing means architecture. It will be further understood that the described processing means has all the necessary operating and application software to enable it to fulfil its purpose.

Unless the context clearly requires otherwise, throughout the description and the claims, the words "comprise", "comprising" and the like are to be construed in an inclusive as opposed to an exclusive or exhaustive sense; that is to say, in the sense of "including, but not limited to". Moreover, for the avoidance of doubt, where reference has been given to an earlier document, whose contents, whether as a whole or in part thereof, are necessary for the understanding of the operation or implementation of any of the embodiments of the present invention by the intended reader, being a man skilled in the art, then said contents should be taken as being incorporated herein by said reference thereto.

What is claimed is:

1. A system for configuring a multi-user communication service comprising:
    multi-user service configuration means for coordinating a plurality of process control flows to configure the multi-user communications service, in which each process control flow of the plurality of process control flows represents a user process;
    choreography means for linking the plurality of process control flows with a multi-user communication service configuration process, in which the choreography means provides a fixed interface supporting an independent reconfiguration of the plurality of process control flows and the multi-user communication service configuration process;
    means providing a plurality of components of a process control flow of the plurality of process control flows, in which each component of the plurality of components comprises a process control activity between two of user processes; and
    means for aggregating the plurality of components into a sequence of the process control flow, in which the each component of the plurality of components is arranged to process a data structure, and in which the data structure is same for each component of the plurality of components of the process control flow; and
    message exchange means exchanging message comprises:
        a first message exchange comprising a request message for acceptance into the multi-user communication service and a response message;
        a second message exchange comprising a message registering for a callback on connection to the multi-user communication service and a connection callback response message;
        a third message exchange comprises a message acknowledging connection to the multi-user communication service; and
        a fourth message exchange comprising a message notifying termination of the connection to the multi-user communication service.

2. A system, as claimed in claim 1 in which the choreography means is implemented with business process technology.

3. A system, as claimed in claim 1, in which the choreography means is implemented using business process execution language.

4. A system as claimed in claim 1 in which the multi-user service configuration means comprises a further process control flow.

5. A system as claimed in claim 1 in which each process control flow is implemented with business process technology.

6. A system, as claimed in claim 1, in which each process control flow is implemented using business process execution language.

7. A system, as claimed in claim 1, in which, the multi-user service configuration means comprises:
    means for receiving via each of the plurality of process control flows a request for a user to join the multi-user communication service;
    means for setting up communication between all the requesting users; and
    means for granting for each user via a respective one of the plurality of process control flows permission to join the multi-party communication service.

8. A system as claimed in claim 7 in which the means for setting up communication is arranged to set up the communication upon receipt of a request from a user designated as a host.

9. A system as claimed in claim 1 in which the multi-user service configuration means comprises means for seeking authentication and authorization of each request prior to granting to each requesting user permission to join the multi-party communication service.

10. A system as claimed in claim 1 in which the multi-user service configuration means comprises means for receiving from each user an indication that the user is leaving the multi-party communication service and for terminating that user's participation in the multi-user communications service.

11. A system, as claimed in claim 1, in which each process control flow is implemented as a number of communications functional blocks linked by process logic.

12. A system, as claimed in claim 1, comprising means to configure at least one of the process control flows by modifying the process logic while leaving the functional blocks, the configuration process and the choreography unchanged.

13. A system, as claimed in claim 1, comprising means to configure at least one of the process control flows by substituting one or more functional blocks while leaving the process logic, the configuration process and the choreography unchanged.

14. An Internet Protocol communications network comprising a plurality of devices in which the network is configured by the system of claim 1.

15. A system as claimed in claim 1, in which the process control flow is controlled by business process management technology.

16. A system as claimed in claim 1 in which the process control flow is implemented using business process execution language.

17. A system, as claimed in claim 1, in which the components of each process control flow are linked by process logic to form the process control flow.

18. A system, as claimed in claim 17, comprising means to configure at least one of the process control flows by modifying the process logic while leaving the functional blocks unchanged.

19. A system, as claimed in claim 17, comprising means to configure at least one of the process control flows by substituting one or more functional blocks while leaving the process logic unchanged.

20. A system as claimed in claim 1, comprising means for combining a plurality of sequences of the components into a higher-level-communication function.

21. A system as claimed in claim 1, in which each higher-level-communication function is arranged to process the data structure.

22. A system as claimed in claim 1, comprising means for arranging a plurality of higher-level communications functions to execute in parallel.

23. A system as claimed in claim 1, in which the communications comprises an Internet Protocol based communication service.

24. An Internet Protocol communications network comprising a plurality of devices in which the network is configured by the system of claim 1.

25. A system as claimed in claim 1, in which the component includes a component of a process control flow including:
   (a) receiving from a source a request comprising one or more parameters for communications process control;
   (b) identifying constraints relating to the communications process and comparing the parameters received with the request with the constraints;
   (c) checking for a result from the comparison of step (b) and attempting to set up a connection to an end point identified by one or more of the parameters, if the result is positive;
   (d) waiting for the result of the connection attempt in step (c);
   (e) upon receiving the result of the connection attempt, assessing the result; and
   (f) notifying the source of the request of the outcome of the communications process control flow.

26. A system as claimed in claim 25 in which each of the steps is called and passed a data structure, in sequence, by a higher-level process, in which each of the steps updates the data structure, as appropriate and passes control and the data structure back to the higher-level process on completion.

27. A system as claimed in claim 25 in which between one and three of the steps are stubs, in which each stub only acts to pass control and a data structure back to the higher-level process.

28. A system as claimed in claim 25 in which each method step is implemented as a network service element.

29. A system as claimed in claim 25 in which functions (a) to (c), (e) and (f) are implemented as service building blocks (SBBs).

30. A system as claimed in claim 29 in which implementation by at least one of the SBBs is achieved by the SBB interfacing with a network element by means of a plain old java object (POJO).

31. A system as claimed in claim 29 in which implementation by at least one of the SBBs is achieved by the SBB calling a common capability.

32. A system as claimed in claim 29 in which constraints are defined and processed independent of the service control flow.

33. A system as claimed in claim 25 in which each SBB is configured at run time.

34. A system as claimed in claim 25 including provisioning a data structure, in which the data structure is processed in each step.

35. A system as claimed in claim 34, in which the data structure comprises:
   i) a request field for the request from a user for a communications service;
   ii) a service identity field for the identity of the communications service;
   iii) a user identity field for the identity of the user;
   iv) an end points identity field for the identities of the end points of the process control flow component;
   v) an active constraints field;
   vi) a results field for the result of the requested service control flow;
   vii) a response status field;
   viii) a response field for the response to the service request; and
   ix) an output field for an output provided by one or both endpoints.

36. A system as claimed in claim 34 in which the data structure is a Cxf Context data structure.

37. A system as claimed in claim 25 in which the one or more parameters comprise at least one of a logical identifier and a logical address.

38. A system as claimed in claim 25 in which the constraints comprise at least one of financial, presence, security and physical constraints.

39. A system as claimed in claim 25 in which each method step interfaces to each adjacent method step by means of Web Services Description Language (WSDL).

40. A system as claimed in claim 25 in which the request comprises a SIP invite.

41. A system as claimed in claim 25 in which the identity of the user comprises a SIP URI.

42. A system as claimed in claim 25 including employing a business process management language to control the flow.

43. A system as claimed in claim 25 including employing reusable service flow elements of various granularities to construct a service.

44. A method of configuring a multi-user communication service including:
   setting up a choreography linking a plurality of user process control flows and a multi-user communication service configuration process, in which each user process control flow of the plurality of user process control flows represents a user process;
   receiving via the choreography at the multi-user communication service configuration process requests from the plurality of user process control flows for access to the multi-user communication service and granting access to the multi-user communication service for selected users, in which the choreography provides a fixed interface supporting an independent reconfiguration of the plurality of user process control flows and the multi-user communication service configuration process;
   effecting communication within the multi-user communication service in a communication network, the effecting communication including:
      providing a plurality of components for a user process control flow of the plurality of user process control flows, in which each component of the plurality of components comprises a process control activity between two of user processes;
      aggregating the plurality of components into a sequence of the user process control flow, in which the each of the plurality of component comprises:
         a request comprising one or more parameters for the multi-user communication service configuration process;
         identifying constraints related to the multi-user communication service configuration process and comparing the parameters received from the request with the constraints;
         checking a result from the comparison and attempting to set up a connection to an end point identified by one or more of the parameters, if the result is positive;
         waiting a result of the attempted connection;
         upon receiving the result of the attempted connection, assessing the result of the attempted connection; and notifying a source of the request of an outcome of the user process control flow.

45. A method as claimed in claim 44 in which the choreography includes the exchange of a fixed portfolio of messages.

46. A method as claimed in claim 45 in which the portfolio of messages includes a request from each user process control flow to the multi-user service configuration process for access to the multi-user communications service; and
a grant message from the configuration process to each of the selected users.

47. A method as claimed in claim 44 including: reconfiguring the multi-user service configuration process to configure a different multi-user communications service while maintaining the ability to interface via the choreography with the plurality of user process control flows.

48. A method as claimed in claim 44 including: reconfiguring one or more of the user process control flows while maintaining the ability to interface via the choreography with the multi-user service configuration process.

49. A method, as claimed in claim 44, in which the multi-user service configuration means comprises a further process control flow.

50. A method, as claimed in claim 44, in which each process control flow is implemented with business process technology.

51. A method as claimed in claim 44, in which each process control flow is implemented using business process execution language.

52. A method as claimed in claim 44, in which each process control flow is implemented as a number of communications functional blocks linked by process logic.

53. A method as claimed in claim 44, in which each process control flow is implemented as a number of communications functional blocks linked by process logic in which each user process control flow is configurable by modifying the process logic while leaving the functional blocks, the service configuration process and the choreography unchanged.

54. A method, as claimed in claim 44, in which each process control flow is implemented as a number of communications functional blocks linked by process logic in which each user process control flow is configurable by substituting one or more functional blocks while leaving the process logic, the service configuration process and the choreography unchanged.

55. A method, as claimed in claim 44, in which the multi-user service configuration process grants access to the multi-user communications service to selected users.

56. A computer program or suite of computer programs executable by a computer system to cause the computer system to perform the method of claim 44.

57. A modulated carrier signal incorporating data corresponding to the computer program or at least one of the suite of programs of claim 56.

58. A computer readable storage medium storing a computer program or any one or more of a suite of computer programs according to claim 56.

59. A method as claimed in claim 44 further including a method for effecting communication between devices in a communications network comprising a plurality of devices, the method comprising:
(a) providing a plurality of components of a process control flow in which each component comprises a process control activity between two of the devices;
(b) aggregating the plurality of components into a sequence of the communications process control flow; and
(c) executing the process control flow to interact with at least two of the communications system devices to implement the communication.

60. A method as claimed in claim 59 using business process management technology to control the process control flow.

61. A method as claimed in claim 59 using business process execution language to implement the process control flow.

62. A method as claimed in claim 59, in which the components of each process control flow are implemented as communications functional blocks linked by process logic.

63. A method as claimed in claim 62, comprising means to configure at least one of the process control flows by modifying the process logic while leaving the functional blocks unchanged.

64. A method as claimed in claim 62, comprising means to configure at least one of the process control flows by substituting one or more functional blocks while leaving the process logic unchanged.

65. A method as claimed in claim 59 in which each component is arranged to process a data structure; in which the data structure is the same for each component of the communications process control flow.

66. A method as claimed in claim 59 including combining a plurality of sequences of the components into a higher-level-communication function.

67. A method as claimed in claim 66 in which each higher-level-communication function is arranged to process the data structure.

68. A method as claimed in claim 66 including arranging a plurality of higher-level communications functions to execute in parallel.

69. A method as claimed in claim 59 in which the communications comprises an IP based communication service.

70. A communications network comprising a plurality of devices in which the network is configured by the method of claim 59.

71. A method as claimed in claim 59 in which the component includes a component of a process control flow including:
(a) receiving from a source a request comprising one or more parameters for communications process control;
(b) identifying constraints relating to the communications process and comparing the parameters received with the request with the constraints;
(c) checking for a result from the comparison of step (b) and attempting to set up a connection to an end point identified by one or more of the parameters, if the result is positive;
(d) waiting for the result of the connection attempt in step (c);
(e) upon receiving the result of the connection attempt, assessing the result; and
(f) notifying the source of the request of the outcome of the communications process control flow.

72. A method as claimed in claim 71 in which each of the steps is called and passed a data structure, in sequence, by a higher-level process, in which each of the steps updates the data structure, as appropriate and passes control and the data structure back to the higher-level process on completion.

73. A method as claimed in claim 71 in which between one and three of the steps are stubs, in which each stub only acts to pass control and a data structure back to the higher-level process.

74. A method as claimed in claim 71 in which each method step is implemented as a network service element.

75. A method as claimed in claim 71 in which method steps (a) to (c), (e) and (f) are implemented as service building blocks (SBBs).

76. A method as claimed in claim 75 in which implementation by at least one of the SBBs is achieved by the SBB interfacing with a network element by means of a plain old java object (POJO).

77. A method as claimed in claim 75 in which implementation by at least one of the SBBs is achieved by the SBB calling a common capability.

78. A method as claimed in claim 75 in which constraints are defined and processed independent of the service control flow.

79. A method as claimed in claim 71 in which each SBB is configured at run time.

80. A method as claimed in claim 71 including provisioning a data structure, in which the data structure is processed in each step.

81. A method as claimed in claim 80, in which the data structure comprises:
   i) a request field for the request from a user for a communications service;
   ii) a service identity field for the identity of the communications service;
   iii) a user identity field for the identity of the user;
   iv) an end points identity field for the identities of the end points of the process control flow component; v) an active constraints field;
   vi) a results field for the result of the requested service control flow,
   vii) a response status field;
   viii) a response field for the response to the service request; and
   ix) an output field for an output provided by one or both endpoints.

82. A method as claimed in claim 80 in which the data structure is a Cxf Context data structure.

83. A method as claimed in claim 71 in which the one or more parameters comprise at least one of a logical identifier and a logical address.

84. A method as claimed in claim 71 in which the constraints comprise at least one of financial, presence, security and physical constraints.

85. A method as claimed in claim 71 in which each method step interfaces to each adjacent method step by means of Web Services Description Language (WSDL).

86. A method as claimed in claim 71 in which the request comprises a SIP invite.

87. A method as claimed in claim 71 in which the identity of the user comprises a SIP URI.

88. A method as claimed in claim 71 including employing a business process management language to control the flow.

89. A method as claimed in claim 71 including employing reusable service flow elements of various granularities to construct a service.

90. A computer program or suite of programs so arranged such that when executed by a computer system it/they cause/s the system to provide the component of claim 71.

91. A computer program or suite of programs so arranged such that when executed by a computer system it/they cause/s the system to perform the method of claim 59.

92. A choreography system comprising:
   choreography means for supporting a message exchange between each of a plurality of users requesting a multi-user communication service and configuration means for defining the multi-user communication service, in which the each of the plurality of users is represented by a process control flow of a plurality of process control flows, and the choreography means provides a fixed interface supporting an independent reconfiguration of the plurality of process control flows and a multi-user service configuration process;
   means providing a plurality of components of the process control flow of the plurality of process control flows, in which each component of the plurality of components comprises a process control activity between two of users requesting the multi-user communication service; and
   means for aggregating the plurality of components into a sequence of the process control flow, in which the each component of the plurality of components is arranged to process a data structure, and in which the data structure is same for each component of the plurality of components of the process control flow; and
   in which the message exchange comprises:
      a first bi-directional interchange comprising a request message from a user to the multi-user communication service in the configuration means followed by a message from the multi-user communication service in the configuration means to the user;
      a second bi-directional interchange comprising a registration message from the user to the multi-user communication service in the configuration means, wherein the registration message is for registering the user for a connect callback message followed by a connect callback message from the multi-user communication service in the configuration means to the user;
      a third interchange comprising an acknowledgement message from the user to the multi-user communication service in the configuration means; and
      a fourth interchange comprising a termination message from the user to the multi-user communication service in the configuration means.

93. A method for configuring a multi-user communications service, said method comprising:
   coordinating a plurality of process control flows to configure a multi-user communications service, in which each process control flow of the plurality of process control flows represents a user process;
   linking, via a fixed interface, the plurality of process control flows with a multi-user communication service configuration process, the fixed interface supporting an independent reconfiguration of the plurality of process control flows and the multi-user communication service configuration process;
   providing a plurality of components of a process control flow of the plurality of process control flows, in which each component of the plurality of components comprises a process control activity between two of user processes;
   aggregating the plurality of components into a sequence of the process control flow, in which the each component of the plurality of components is arranged to process a data structure, and in which the data structure is the same for each component of the plurality of components of the process control flow; and
   exchanging messages comprising:
      in a first message exchange, a request message for acceptance into the multi-user communication service and a response message;

in a second message exchange, a message registering for a callback on connection to the multi-user communication service and a connection callback response message;

in a third message exchange, a message acknowledging connection to the multi-user communication service; and in a fourth message exchange, a message notifying termination of the connection to the multi-user communication service.

94. A method comprising:

exchanging messages in a message exchange between each of a plurality of users requesting a multi-user communication service, in which the each of the plurality of users is represented by a process control flow of a plurality of process control flows;

defining the multi-user communication service;

providing a fixed interface supporting an independent reconfiguration of the plurality of process control flows and a multi-user service configuration process;

providing a plurality of components of the process control flow of the plurality of process control flows, in which each component of the plurality of components comprises a process control activity between two of users requesting the multi-user communication service; and aggregating the plurality of components into a sequence of the process control flow, in which the each component of the plurality of components is arranged to process a data structure, and in which the data structure is same for each component of the plurality of components of the process control flow;

in which the message exchange comprises:

a first bi-directional interchange comprising a request message from a user to the multi-user communication service in the configuration means followed by a message from the multi-user communication service in the configuration means to the user;

a second bi-directional interchange comprising a registration message from the user to the multi-user communication service in the configuration means, wherein the registration message is for registering the user for a connect callback message followed by a connect callback message from the multi-user communication service in the configuration means to the user;

a third interchange comprising an acknowledgment message from the user to the multi-user communication service in the configuration means; and a fourth interchange comprising a termination message from the user to the multi-user communication service in the configuration means.

* * * * *